United States Patent
Khoshnevisan et al.

(10) Patent No.: US 11,627,601 B2
(45) Date of Patent: Apr. 11, 2023

(54) NON-TRANSPARENT SINGLE FREQUENCY NETWORK SCHEME

(71) Applicant: QUALCOMM Incorporated, San Diego, CA (US)

(72) Inventors: Mostafa Khoshnevisan, San Diego, CA (US); Xiaoxia Zhang, San Diego, CA (US); Tao Luo, San Diego, CA (US); Jing Sun, San Diego, CA (US); Sungwoo Park, San Diego, CA (US); Wooseok Nam, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 70 days.

(21) Appl. No.: 17/146,227

(22) Filed: Jan. 11, 2021

(65) Prior Publication Data

US 2021/0235455 A1 Jul. 29, 2021

Related U.S. Application Data

(60) Provisional application No. 62/967,469, filed on Jan. 29, 2020.

(51) Int. Cl.
*H04W 72/04* (2009.01)
*H04W 72/53* (2023.01)
(Continued)

(52) U.S. Cl.
CPC ....... *H04W 72/53* (2023.01); *H04W 72/0446* (2013.01); *H04W 72/0453* (2013.01);
(Continued)

(58) Field of Classification Search
CPC ........... H04W 72/0493; H04W 72/042; H04W 72/0446; H04W 72/0453; H04W 76/27;
(Continued)

(56) References Cited

U.S. PATENT DOCUMENTS

2019/0141691 A1* 5/2019 Kwon .................... H04B 7/088
2019/0260532 A1 8/2019 Manolakos et al.
(Continued)

FOREIGN PATENT DOCUMENTS

WO 2019153347 A1 8/2019

OTHER PUBLICATIONS

Huawei., et al., "Summary of Evaluation Results for Reliability Robustness Based Multi-TRP Transmission", 3GPP TSG RAN WG1 Meeting #96bis, 3GPP Draft; R1-1905806, 3rd Generation Partnership Project (3GPP), Mobile Competence Centre; Sophia-Antipolis Cedex; France, vol. RAN WG1, No. Xi 'an, China; Apr. 8, 2019-Apr. 12, 2019, (Apr. 15, 2019), 35 Pages, XP051704916, Retrieved from the Internet: URL: http://www.3gpp.orgjftpjtsg%5FranjWG1%5FRL1/TSGR1%5F96b/Docs/R1%2D1905806%2Ezip[retrieved on Apr. 15, 2019], pp. 18-32, The whole document.
(Continued)

*Primary Examiner* — Dady Chery
(74) *Attorney, Agent, or Firm* — Arent Fox, LLP; Dang M. Vo

(57) ABSTRACT

Example implementations include a method, apparatus and computer-readable medium of wireless communication. A user equipment (UE) may receive a downlink control information (DCI) indicating two or more transmission configuration indication (TCI) states for a physical downlink shared channel (PDSCH). The UE may differentiate that the two or more TCI states apply to all demodulation reference signal (DMRS) ports or all transmission layers across all resource blocks and symbols for the PDSCH from TCI states that apply to different sets of DMRS ports or different sets of resource blocks or symbols. The UE may generate a composite quasi-co-location (QCL) based on the two or more TCI states in response to the differentiating. The UE may receive the PDSCH based on the composite QCL.

68 Claims, 11 Drawing Sheets

(51) Int. Cl.
*H04W 72/0453* (2023.01)
*H04W 80/02* (2009.01)
*H04W 72/0446* (2023.01)
*H04W 76/27* (2018.01)
*H04W 72/23* (2023.01)

(52) U.S. Cl.
CPC ........... *H04W 72/23* (2023.01); *H04W 76/27* (2018.02); *H04W 80/02* (2013.01)

(58) Field of Classification Search
CPC ............. H04W 80/02; H04W 72/1294; H04L 5/0051; H04L 5/0094; H04L 5/0035; H04L 5/0023
See application file for complete search history.

(56) References Cited

U.S. PATENT DOCUMENTS

2020/0337058 A1    10/2020  Song et al.
2022/0124751 A1*    4/2022  Matsumura .......... H04B 7/0617
2022/0191892 A1*    6/2022  Muruganathan ...... H04L 5/0016

OTHER PUBLICATIONS

Intel Corporation: "Discussion on multi-TRP/Multi-Panel Transmission", 3GPP TSG RAN WG1 Meeting #95, 3GPP Draft; R1-1812509 MultiTRP Final, 3rd Generation Partnership Project (3GPP), Mobile Competence Centre; Sophia-Antipolis Cedex; France, vol. RAN WG1. No. Spokane, USA; Nov. 12, 2018-Nov. 16, 2018, Nov. 3, 2018 (Nov. 3, 2018), XP051478738, pp. 1-13, Retrieved from the Internet: URL:http://www.3gpp.org/ftp/tsg%5Fran/WG1%5FRL1/TSGR1%5F95/Docs/R1%2D1812509%2Ezip [retrieved on Nov. 3, 2018], p. 1-p. 2, pp. 5-10.
International Search Report and Written Opinion—PCT/US2021/013039—ISA/EPO—dated May 7, 2021.

* cited by examiner

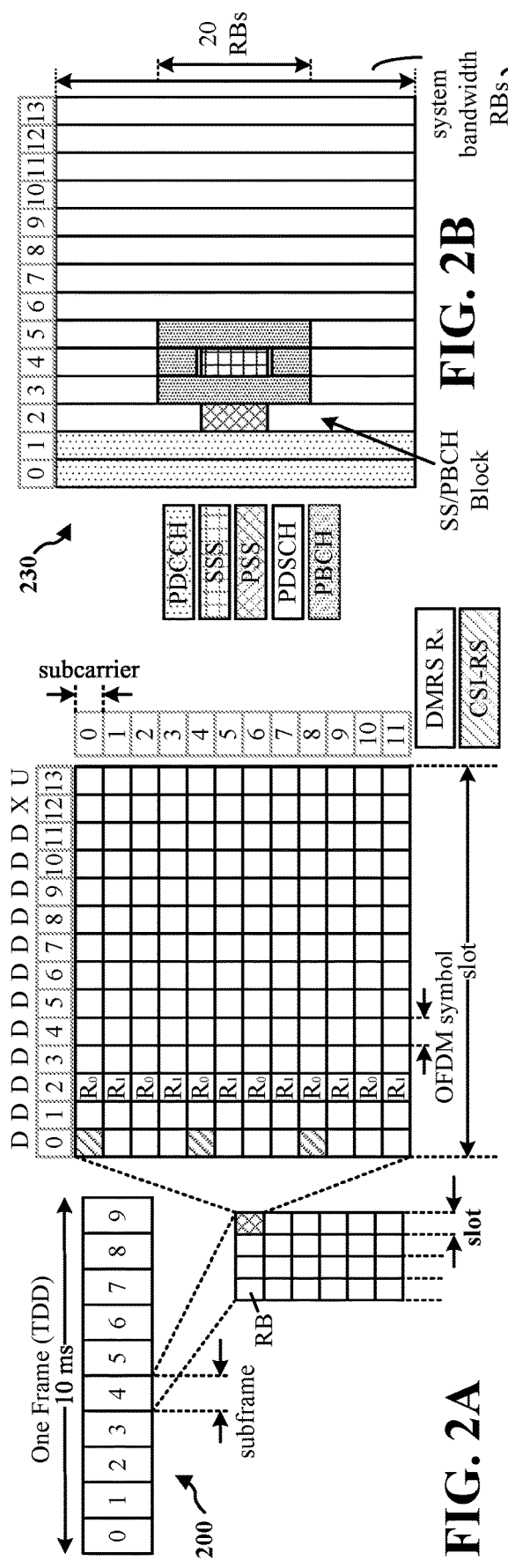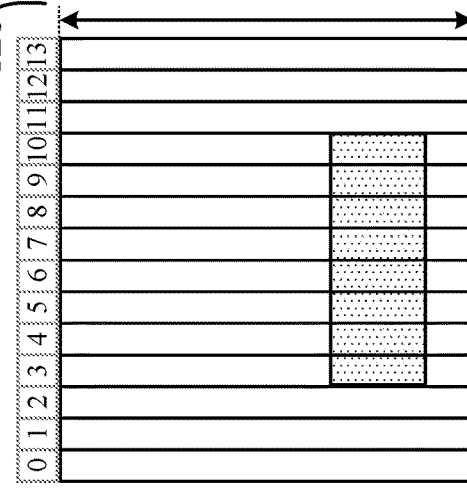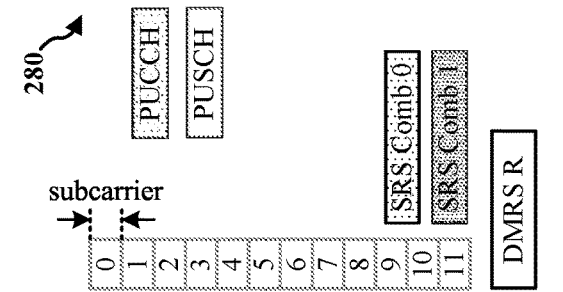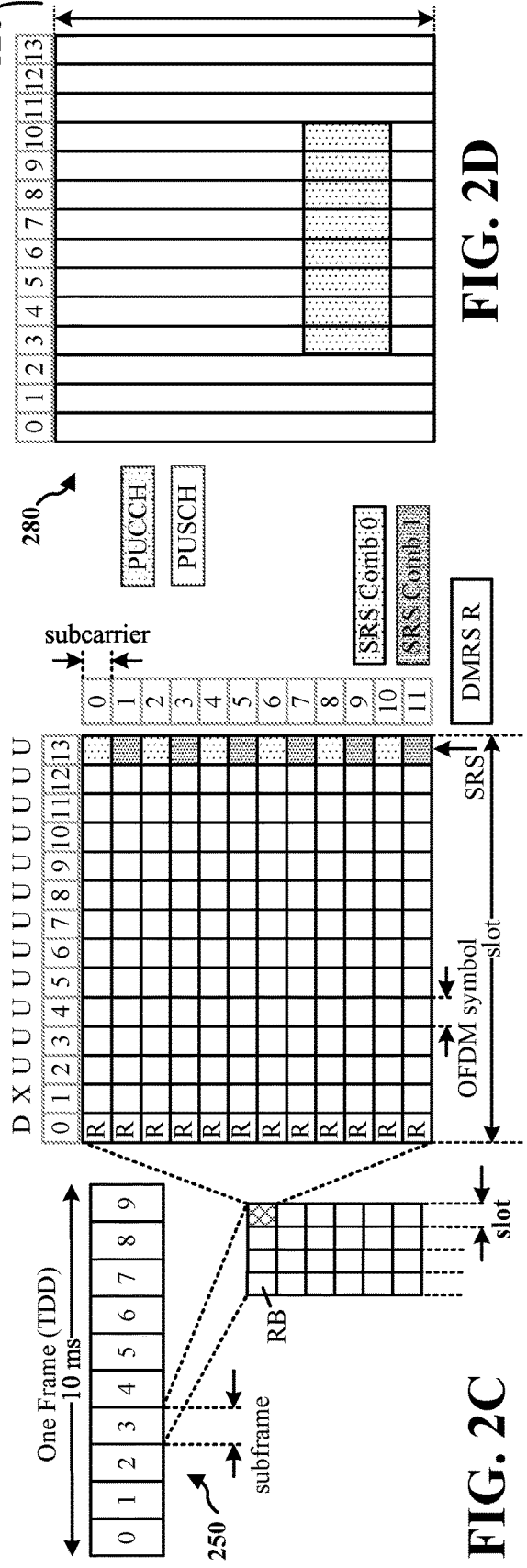

NON-TRANSPARENT SINGLE FREQUENCY NETWORK SCHEME

CROSS REFERENCE TO RELATED APPLICATIONS

This application claims priority to U.S. Provisional Application No. 62/967,469 titled "NON-TRANSPARENT SINGLE FREQUENCY NETWORK SCHEME," filed Jan. 29, 2020, which is assigned to the assignee hereof, and incorporated herein by reference in its entirety.

BACKGROUND

Technical Field

The present disclosure relates generally to communication systems, and more particularly, to apparatus and methods of differentiating transmission configuration indication (TCI) states that apply to a single frequency network (SFN) transmission under a non-transparent SFN scheme.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a user equipment (UE). The method may include receiving a downlink control information (DCI) indicating two or more transmission configuration indication (TCI) states for a physical downlink shared channel (PDSCH). The method may include differentiating that the two or more TCI states apply to all demodulation reference signal (DMRS) ports or all transmission layers across all resource blocks and symbols for the PDSCH from TCI states that apply to different sets of DMRS ports or different sets of resource blocks or symbols. The method may include determining a composite quasi-co-location (QCL) based on the two or more TCI states in response to the differentiating. The method may include receiving the PDSCH based on the composite QCL.

The disclosure also provides an apparatus (e.g., a UE) including a memory storing computer-executable instructions and at least one processor configured to execute the computer-executable instructions to perform the above method, an apparatus including means for performing the above method, and a computer-readable medium storing computer-executable instructions for performing the above method.

In another aspect, the disclosure provides a method of wireless communication for a base station. The method may include transmitting a DCI indicating two or more TCI states for a PDSCH. The DCI may differentiate that the two or more TCI states apply to all DMRS ports or all transmission layers across all resource blocks and symbols for the PDSCH from TCI states that apply to different sets of DMRS ports or different sets of resource blocks or symbols. The method may include transmitting the PDSCH from two or more transmit receive points (TRPs), wherein each of the TRPs corresponds to one of the TCI states.

The disclosure also provides an apparatus (e.g., a base station) including a memory storing computer-executable instructions and at least one processor configured to execute the computer-executable instructions to perform the above method, an apparatus including means for performing the above method, and a computer-readable medium storing computer-executable instructions for performing the above method.

In an aspect, the disclosure provides a method of wireless communication for a UE. The method may include receiving a control message configuring at least one physical downlink control channel (PDCCH) candidate with two or more TCI states that apply to a PDCCH DMRS port or a transmission layer across all resource blocks and symbols of the PDCCH candidate. The method may include determining a composite quasi-co-location (QCL) based on the two or more TCI states. The method may include receiving a downlink control information (DCI) on the at least one PDCCH candidate based on the composite QCL.

The disclosure also provides an apparatus (e.g., a UE) including a memory storing computer-executable instructions and at least one processor configured to execute the computer-executable instructions to perform the above method, an apparatus including means for performing the above method, and a computer-readable medium storing computer-executable instructions for performing the above method.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame.

FIG. 2B is a diagram illustrating an example of DL channels within a subframe.

FIG. 2C is a diagram illustrating an example of a second frame.

FIG. 2D is a diagram illustrating an example of a UL channels within a subframe.

DETAILED DESCRIPTION

Figure 1:
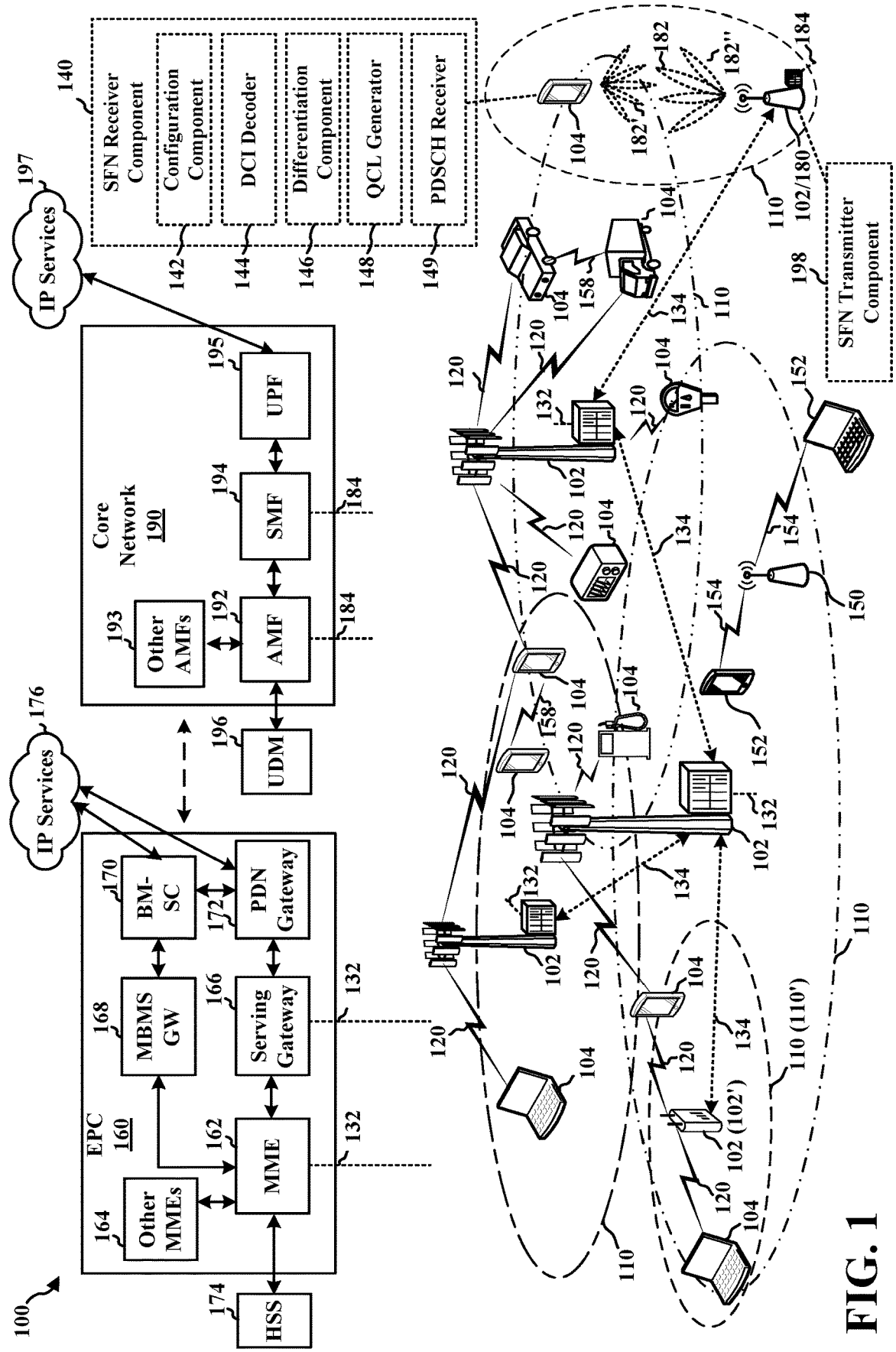
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A single frequency network (SFN) transmission may refer to a transmission from two or more transmit-receive points (TRPs) where each TRP transmits the same signal on the same resources such that to a user equipment (UE) receiving the transmission, the combined transmission appears to be from a single TRP. In other words, in a SFN transmission, a transmission configuration indicator (TCI) state applies to all demodulation reference signal (DMRS) ports or all transmission layers across all resource blocks and symbols for the downlink transmission. In an aspect, transmitting data as an SFN transmission may improve reliability of the transmission in comparison to a transmission from a single TRP.

A transparent SFN transmission may utilize a single TCI state in which the two or more TRPs transmit a reference signal as a SFN transmission. The UE may receive the combined reference signal and determine a quasi-co-location (QCL) for receiving a downlink transmission. In contrast, in a non-transparent SFN transmission, two or more TCI states may be indicated to the UE. Each TRP may transmit a different reference signal according to one of the TCI states. The UE may receive the different reference signals and determine a composite QCL based on the different reference signals.

Indication of a non-transparent SFN transmission may be more complex than indication of a transparent SFN transmission. For a transparent SFN transmission, the base station may transmit a downlink control information (DCI) indicating the TCI states for transparent SFN transmission, and the UE may receive the SFN transmission in the same manner as a transmission from a single TRP (i.e., the SFN nature of the transmission is transparent to the UE). In contrast, for the non-transparent SFN, the UE determines a composite QCL. Accordingly, the UE may perform an additional operation for non-transparent SFN transmissions when a DCI includes two or more TCIs. Indication of two TCI states in a DCI, however, may also be used to indicate multiplexed transmissions. For example, time division multiplexed (TDM) transmissions may use different TCI states for different symbols, frequency division multiplexed (FDM) transmissions may use different TCI states for different resource blocks, or space division multiplexed (SDM) transmissions may use different TCI states for different layers.

In an aspect of the present disclosure, the UE may receive a DCI indicating two or more TCI states and may differentiate an indicated SFN transmission from a multiplexed transmission. In other words, the UE may differentiate the two or more TCI states that apply to all demodulation reference signal (DMRS) ports or all transmission layers across all resource blocks and symbols for the downlink transmission from TCI states that apply to different sets of DMRS ports or different sets of resource blocks or symbols. Additionally, the DCI may be transmitted on a downlink control channel, such as a physical downlink control channel (PDCCH), where the PDCCH is transmitted as a SFN transmission. The PDCCH may use the same TCI states or different TCI states for the SFN transmission than the SFN transmission for the PDSCH scheduled by the DCI. The UE may assume the TCI states are the same when the DCI does not indicate TCI states.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include a SFN receiver component 140 that receives a SFN transmission based on two or more indicated TCI states and a determined QCL. The SFN receiver component 140 may include a configuration component 142 that receives a configuration message such as a radio resource control (RRC) message or a media access control (MAC) control element (MAC-CE) that indicates differentiation of SFN transmissions. The SFN receiver component 140 may include a DCI decoder 144 that receives a DCI indicating two or more TCI states. The SFN receiver component 140 may include a differentiation component 146 that differentiates the two or more TCI states for a SFN transmission from two TCI states for multiplexed transmissions. The SFN receiver component 140 may include a QCL generator 148 that generates a composite QCL based on the two or more TCI states. The SFN receiver component 140 may include a PDSCH receiver 149 that receives a downlink transmission, such as a PDSCH, based on the composite QCL.

Figure 6:
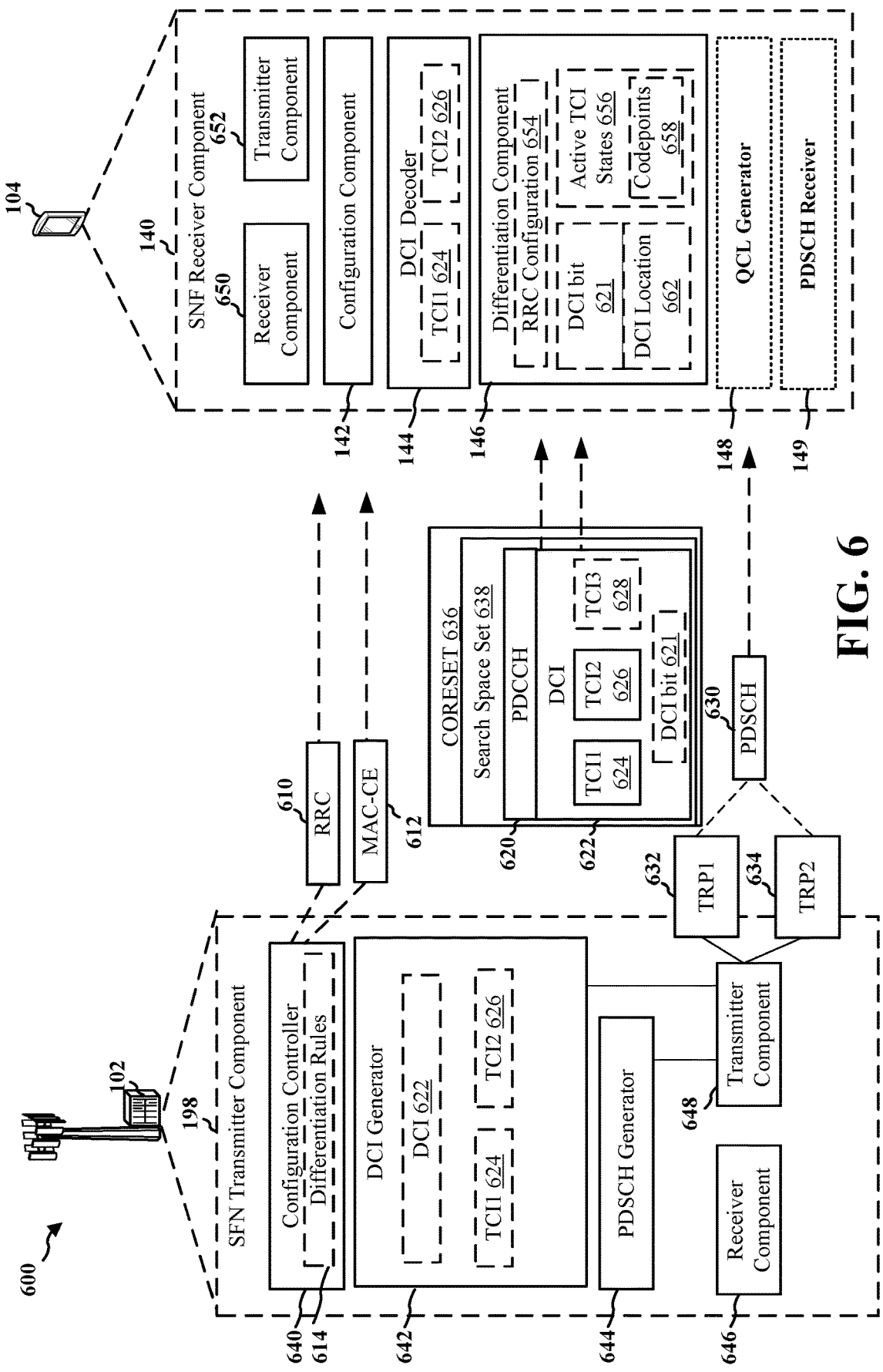
FIG. 6 is a diagram illustrating example communications and components of a base station and a UE.
Figure 7:
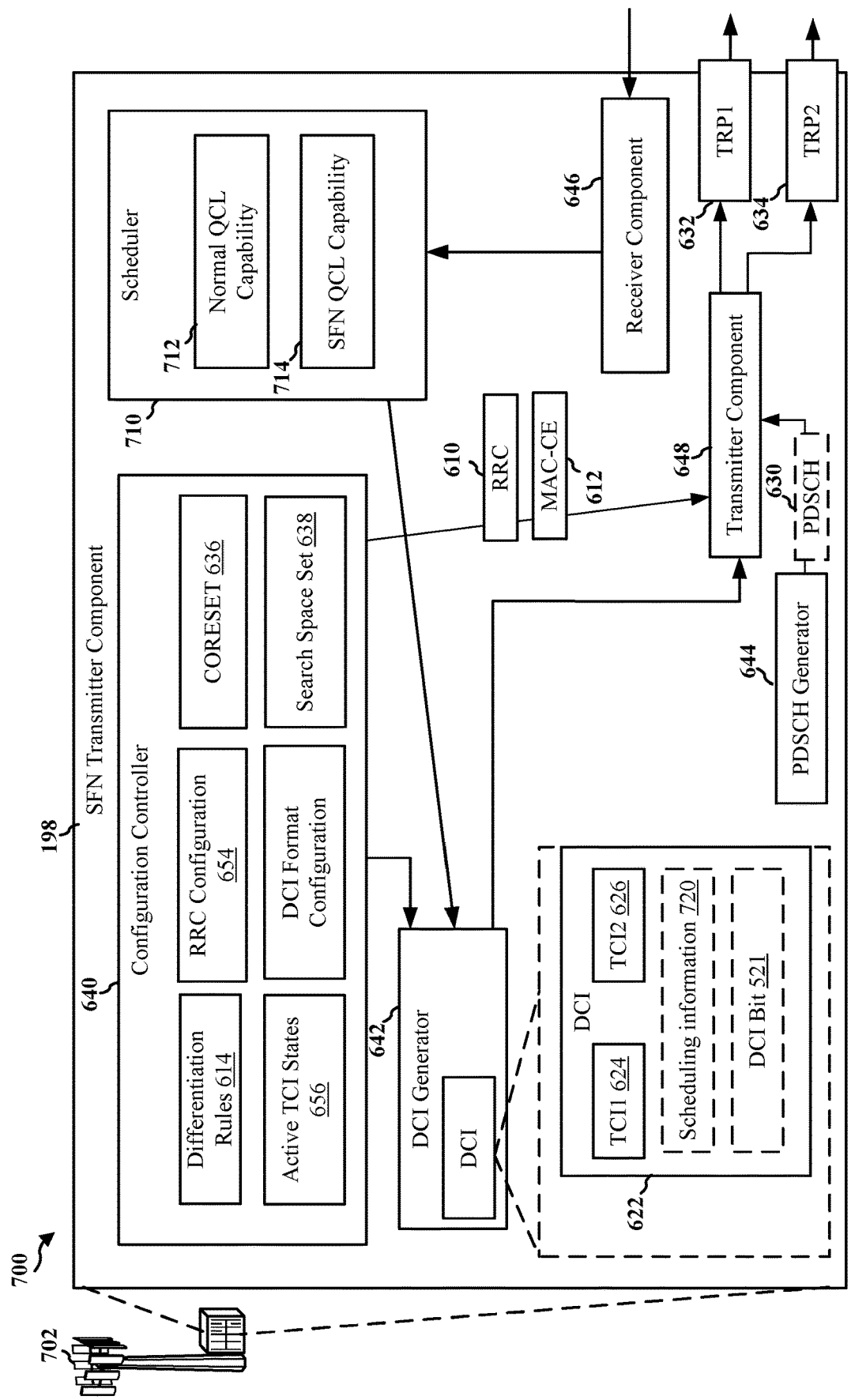
FIG. 7 is a conceptual data flow diagram illustrating the data flow between different means/components in an example base station.

In an aspect, one or more of the base station 102 may include a SFN transmitter component 198 that transmits a DCI indicating two or more TCI states for an SFN transmission and transmits a PDSCH, from two or more TRPs, as an SFN transmission. As illustrated in FIGS. 6 and 7, the SFN transmitter component 198 may include, for example, a DCI generator 642 that transmits a DCI indicating two or more TCI states for a PDSCH that apply to all DMRS ports or all transmission layers across all resource blocks and symbols for the PDSCH. The SFN transmitter component 198 may include a PDSCH generator 644 that transmits the PDSCH from two or more TRPs, each of the TRPs corresponding to one of the TCI states.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
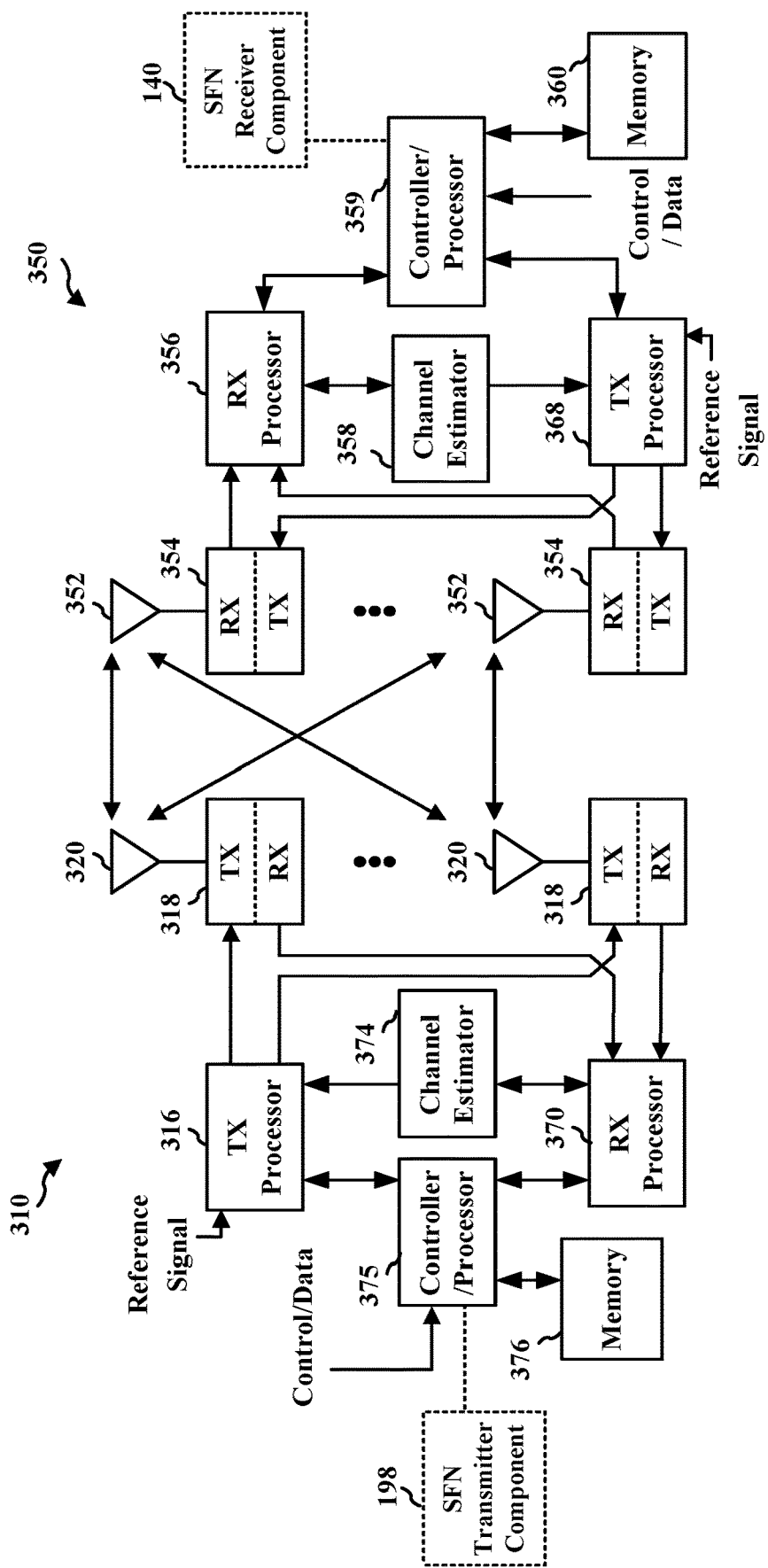
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the SFN receiver component 140 of FIG. 1.

At least one of the TX processor 316, the RX processor 370, and the controller/processor 375 may be configured to perform aspects in connection with the SFN transmitter component 198 of FIG. 1.

Figure 4:
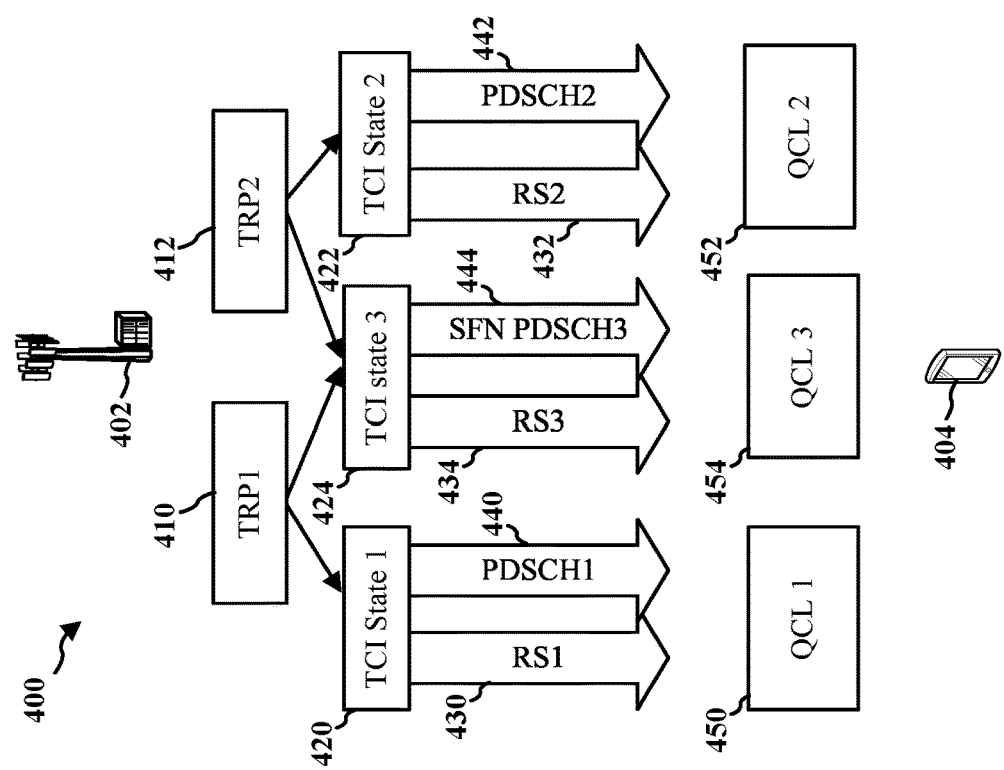
FIG. 4 is a diagram of an example transmission scheme for transparent single frequency network transmissions.

FIG. 4 is a diagram 400 illustrating an example of transparent SFN transmission. A base station 402 may include two or more TRPs (e.g., a first TRP 410 and a second TRP 412). The base station 402 may define various TCI states, which may be configured for the UE 404 via RRC signaling and activated via MAC-CE and/or DCI signaling. For example, the base station 402 may configure a first TCI state 420 that transmits only from the first TRP 410 and a second TCI state 422 that transmits only from the second TRP 412. In each of the TCI states 420 and 422, the respective TRP may transmit a reference signal 430, 432. The UE 404 may determine a respective QCL 450, 452 based on the reference signal and use the respective QCL 450, 452 for receiving the respective PDSCH 440, 442. For SFN transmissions, the base station 402 may configure a third TCI state 424 in which the base station transmits from both of the first TRP 410 and the second TRP 412. In the third TCI state 424, both the first TRP 410 and the second TRP 412 may transmit a third reference signal 434 as an SFN transmission. The UE 404 may receive the third reference signal 434, determine a third QCL 454, and receive the SFN PDSCH 444 based on the third QCL 454. Accordingly, the SFN transmission is transparent to the UE 404 because the UE 404 determines the QCL from the reference signal in the same manner for both single TRP transmissions and SFN transmissions.

Figure 5:
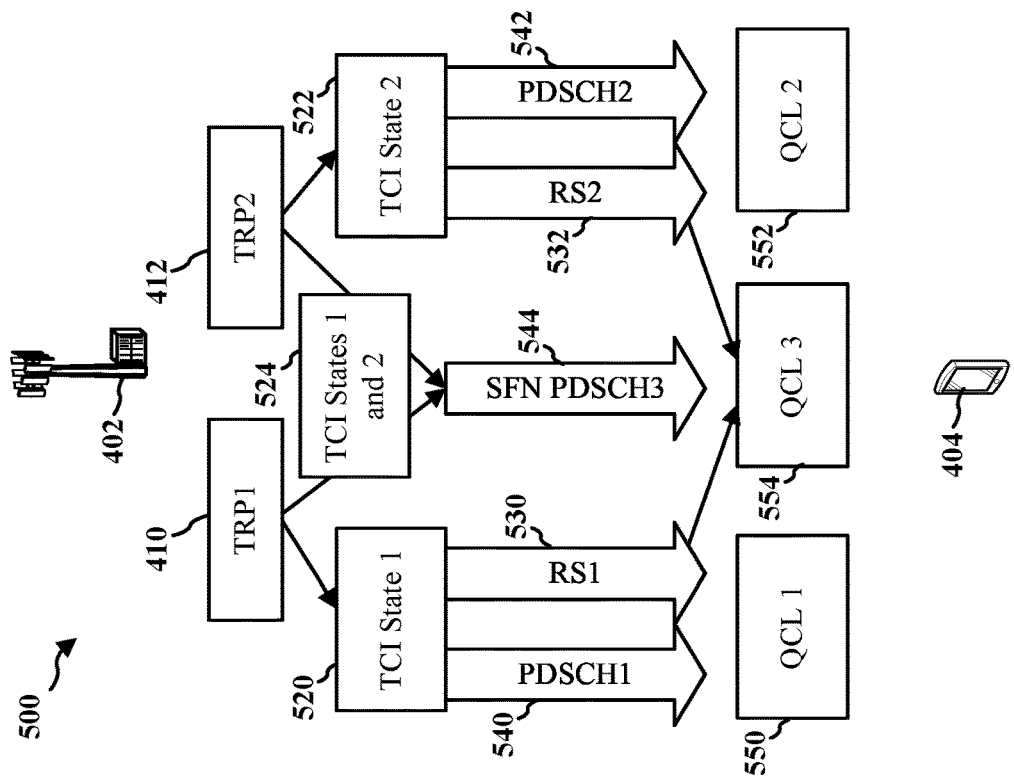
FIG. 5 is a diagram of an example transmission scheme for non-transparent single frequency network transmissions.

FIG. 5 is a diagram 500 illustrating an example of non-transparent SFN transmission. The base station 402 may be similar to the base station 402 of FIG. 4 and may include two or more TRPs (e.g., a first TRP 410 and a second TRP 412). The base station 402 may define various TCI states, which may be configured for the UE 404 via RRC signaling and activated via MAC-CE and/or DCI signaling. For example, the base station 402 may configure a first TCI state 520 that transmits only from the first TRP 410 and a second TCI state 522 that transmits only from the second TRP 412. In each of the TCI states 520 and 522, the respective TRP may transmit a reference signal 530, 532. The UE 404 may determine a respective QCL 550, 552 based on the respective reference signal and use the respective QCL 550, 552 for receiving the respective PDSCH 540, 542. For non-transparent SFN transmissions, the base station 402 may configure the UE 404 to receive a transmission based on two or more TCI states. As illustrated, a SFN PDSCH 544 may be based on a combination 524 of the first TCI state 520 and the second TCI state 522. The UE 404 may receive the first reference signal 530 and the second reference signal 532. The UE 404 may determine a composite QCL 554 based on the first reference signal 530 and the second reference signal 532. The UE 404 may receive the SFN PDSCH 544 based on the composite QCL 554. In an aspect, the non-transparent SFN transmission may use fewer reference signals but the UE 404 may perform an additional operation of determining the composite QCL 554.

FIG. 6 is a diagram 600 illustrating example communications and components of a base station 102 and a UE 104. The UE 104 may include the SFN receiver component 140. The base station 102 may include the SFN transmitter component 198.

The SFN transmitter component 198 may include a configuration controller 640 that transmits a configuration that provides for SFN transmissions. In an aspect, the configuration controller 640 may implement a set of differentiation rules 614 that allow the UE 104 to differentiate an SFN transmission utilizing two or more TCI states from a multiplexed transmission utilizing two TCI states. For example, the configuration controller 640 may transmit an RRC message 610 that indicates that two or more TCI states indicated by a DCI are for an SFN transmission. That is, the RRC message 610 may indicate that two or more TCI states (e.g., TCI states 624, 626) indicated by the DCI 622 apply to all DMRS ports or all transmission layers across all resource blocks and symbols of a PDSCH 630. The configuration controller 640 may transmit the RRC message 610 prior to transmitting the DCI 622. Accordingly, when the UE 104 receives the DCI 622, the UE 104 may interpret the two or more TCI states based on the RRC message 610.

Figure 9:
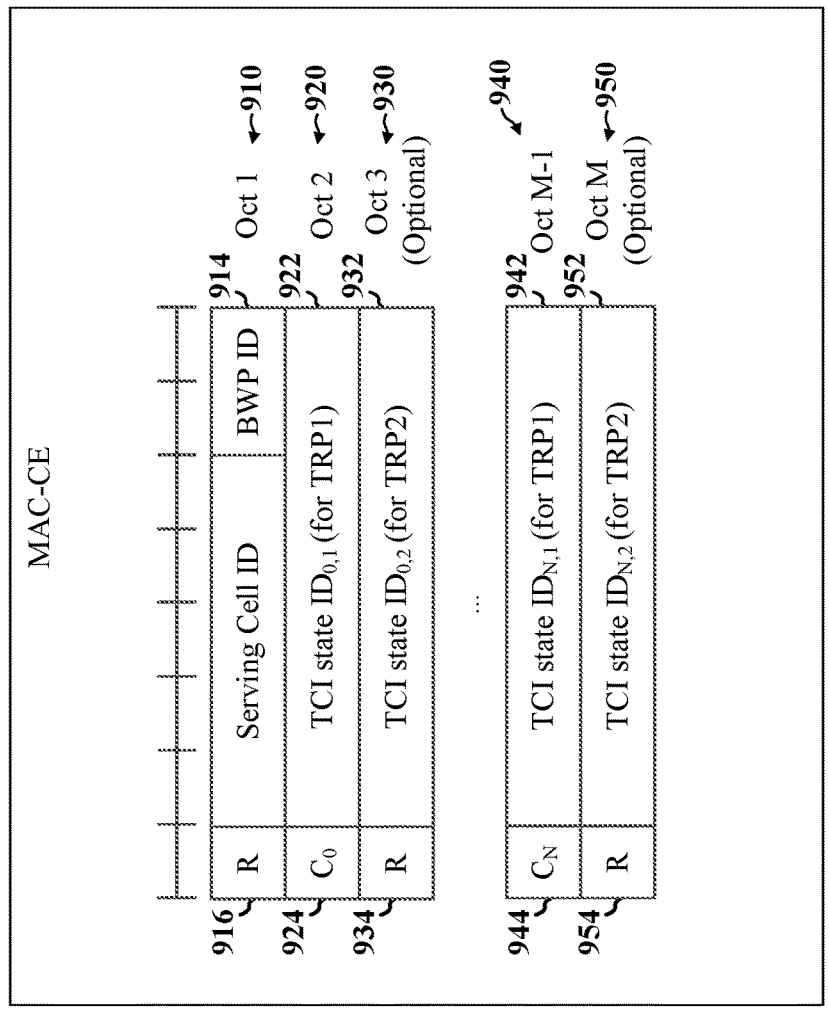
FIG. 9 is a diagram of an example media access control (MAC) control element (CE) for labeling TCI states.

In another example, the configuration controller 640 may transmit a MAC-CE 612 to implement the differentiation rules 614. Referring to FIG. 9, illustrating a detailed example of MAC-CE 612, the MAC-CE 612 may include a number of octets or bytes that may be interpreted by the UE 104 for configuration and/or control. For example, a first octet 910 may indicate a serving cell ID 912 and a bandwidth part ID 914, and a first bit 916 may be reserved. Subsequent octets may indicate activated TCI states and corresponding codepoints. For example, a second octet 920 may include a TCI state ID 922 for a first codepoint. The TCI state ID 922 may apply to a first TRP. A first bit 924 of the second octet 920 may indicate whether a second TCI state is associated with the first codepoint. In an aspect, when the RRC configuration allows either SFN transmissions or multiplexed transmissions, the second TCI state may be for either the SFN transmission or a second one of the multiplexed transmissions. The third octet 930 may include the second TCI state ID 932. In an implementation, the first bit 934 of the third octet (i.e., an octet for the second TCI state) may be reserved because an indication of another TCI state for the codepoint is not needed. In an aspect, the first bit 934 may indicate a label of the pair of TCI state IDs 922, 932 for the first codepoint. That is, the first bit 934 may indicate whether the pair of TCI state IDs 922, 932 is to be used for SFN transmissions or multiplexed transmissions. The MAC-CE 612 may include multiple such octets indicating active TCI states for various codepoints, where N is the number of codepoints. For example, the first bit 944 of the octet 940 may indicate presence of a pair of TCI state IDs 942, 952 for the Nth codepoint, and the first bit 954 of the octet 950 may indicate whether the pair of TCI state IDs 942, 952 apply to all DMRS ports and all transmission layers across all resource blocks and symbols, wherein the differentiating is based on the label of the TCI codepoint of the DCI.

Referring again to FIG. 6, in another example, the DCI 622 may differentiate that the two or more TCI states apply to all DMRS ports or all transmission layers across all resource blocks and symbols for the PDSCH from TCI states that apply to different sets of DMRS ports or different sets of resource blocks or symbols. For instance, the DCI 622 may include a field (e.g., DCI bit 621) that indicates that the DCI 622 is for SFN transmission. The DCI bit 621 may be a reserved bit or a configurable bit of a DCI format. In another example, the DCI 622 may indicate at least three TCI states 624, 626, and 628. The indication of at least three TCI states may imply that the DCI 622 is scheduling an SFN PDSCH transmission.

In another aspect, the location of the DCI 622 may differentiate that the two or more TCI states apply to all DMRS ports or all transmission layers across all resource blocks and symbols for the PDSCH from TCI states that apply to different sets of DMRS ports or different sets of resource blocks or symbols. For example, a control resource set (CORESET) 636 and/or search space set 638 may be configured for scheduling PDSCHs with two or more TCI states that apply to all DMRS ports or all transmission layers across all resource blocks and symbols of a respective PDSCH. For instance, the RRC message 610 may configure a PDCCH candidate 620 that is used to indicate that two or more TCI states apply to the PDCCH DMRS port and all transmission layers across all resource blocks and symbols. The RRC message 610 may be applicable to one or more PDCCH candidates, all PDCCH candidates in a search space set 638, or all PDCCH candidates in all search space sets associated with a CORESET 636.

In an aspect, a DCI 622 indicating two or more TCI states may be transmitted as an SFN transmission in which two or more TCI states apply to a PDCCH DMRS port and a transmission layer across all resource blocks and symbols of the DCI. In an aspect, the DCI 622 may be transmitted as an SFN transmission on the PDCCH candidate(s) configured for scheduling an SFN transmission. In an aspect, when the DCI 622 is transmitted as an SFN transmission, the DCI 622 may not explicitly indicate the two or more TCI states for the PDSCH. Instead, the two or more TCI states for the PDCCH may also apply to the PDSCH. That is, the two or more TCI states that apply to all DMRS ports and all transmission layers across all resource blocks and symbols for the PDSCH may be the same as the two or more TCI states that apply to the PDCCH DMRS port and the transmission layer across all resource blocks and symbols of the DCI. Alternatively, the DCI 622 may indicate two or more TCI states that are different than the TCI states for the DCI and are applicable to the PDSCH. That is, the DCI 622 may include a TCI field that indicates the two or more TCI states that apply to all DMRS ports and all transmission layers across all resource blocks and symbols for the PDSCH.

The base station 102 may include a PDSCH generator 644 that generates a PDSCH for transmission. The PDSCH generator 644 may generate transport blocks of coded data that are used to generate OFDM symbols for transmission. The PDSCH generator 644 may provide the OFDM symbols to the transmitter component 648 for transmission via TRPs 632 and 634.

The base station 102 may include a receiver component 646, which may include, for example, a radio frequency (RF) receiver for receiving the signals described herein. The base station 102 may include a transmitter component 648, which may include, for example, an RF transmitter for transmitting the signals described herein. In an aspect, the receiver component 646 and the transmitter component 648 may be implemented as a transceiver.

As discussed above regarding FIG. 1, the UE 104 may include the configuration component 142, the DCI decoder 144, the differentiation component 146, the QCL generator 148, and the PDSCH receiver 149. The UE 104 may also include a receiver component 650 and a transmitter component 652. The receiver component 650 may include, for example, a RF receiver for receiving the signals described herein. The transmitter component 652 may include for example, an RF transmitter for transmitting the signals described herein. In an aspect, the receiver component 650 and the transmitter component 652 may be implemented as a transceiver.

The configuration component 142 may receive the RRC message 610 and/or the MAC-CE 612. The configuration component 142 may, for example, extract an RRC configuration 654 from the RRC message 610. The configuration component 142 may extract the active TCI states 656 and corresponding codepoints 658 from the MAC-CE 612. The configuration component 142 may provide one or more of the RRC configuration 654, the active TCI states 656, and the codepoints 658 to the differentiation component 146.

The DCI decoder 144 may receive the DCI 622 indicating two or more TCI states 624, 626, 628. For example, the DCI decoder 144 may be configured with one or more CORESETs 636 including one or more search space sets 638. The DCI decoder 144 may perform blind decoding attempts on PDCCH candidates 620 of the configured CORESET 636. Upon successful decoding, the DCI decoder 144 may determine the DCI 622 according to a DCI format. The DCI decoder 144 may extract fields of the DCI 622 including the TCI states 624, 626, 628. The DCI decoder 144 may optionally extract the DCI bit 621 when the DCI format is configured with the DCI bit 621 for indicating SFN transmissions. The DCI decoder 144 may also extract scheduling information (e.g., time and frequency resource allocations) for the PDSCH 630. The DCI decoder 144 may determine the DCI location 662 based on the successfully decoded PDCCH candidate 620, search space set 638, and CORESET 636.

The differentiation component 146 may differentiate whether the DCI 622 indicating two or more TCI states 624, 626, 628 is for an SFN transmission or for multiplexed transmissions. In one example, the differentiation component 146 may differentiate the DCI 622 based on the RRC configuration 654 received in the RRC message 610. In another aspect, the differentiation component 146 may differentiate the DCI 622 based on a label of a TCI codepoint 658 indicated by the MAC-CE 612. In another example, the differentiation component 146 may differentiate the DCI 622 based on the DCI bit 621. In another example, the differentiation component 146 may differentiate the DCI 622 based on whether the DCI 622 indicates 3 or more TCI states 624, 626, 628. In another example, the differentiation component 146 may differentiate the DCI 622 based on the DCI location 662 in the CORESET 636, search space set 638 or the PDCCH candidate 620. For instance, the differentiation component 146 may compare the PDCCH candidate 620 on which the DCI 622 is received with the PDCCH candidates indicated by the RRC message 610 to be for scheduling SFN transmissions.

The QCL generator 148 may generate a composite QCL (e.g., composite QCL 554) based on the two or more TCI states 656 in response to the differentiating. For example, the QCL generator 148 may derive the composite QCL from two or more reference signals (e.g., reference signal 530 and reference signal 532). Each of the two or more reference signals is associated with one of the two or more TCI states.

The PDSCH receiver 149 may receive the PDSCH 630 based on the composite QCL 554. For example, the PDSCH receiver 149 may apply antenna weights of the composite QCL 554 received signals at the UE 104. The PDSCH receiver 149 may further demodulate, de-interleave, and decode the received signals to determine the data transmitted on the PDSCH 630.

FIG. 7 is a conceptual data flow diagram 700 illustrating the data flow between different means/components in an example base station 702, which may be an example of the base station 102 including the SFN transmitter component 198.

The configuration controller 640 may determine operation parameters for a UE 104 for receiving a SFN transmission of a PDSCH. For example, the configuration controller 640 may include the differentiation rules 614 that determine how the UE 104 is to differentiate a DCI scheduling an SFN transmission from a DCI scheduling a multiplexed transmission. The configuration controller 640 may further determine an RRC configuration 654, a CORESET 636, a search space set 638, and a DCI format configuration. The configuration controller 640 may generate the RRC message 610 including one or more of the RRC configuration 654, the CORESET 636, the search space set 638, or the DCI format configuration The configuration controller 640 may transmit the RRC message 610 to the UE 104 via the transmitter component 648. The configuration controller 640 may also determine active TCI states 656, which the configuration controller 640 may include the MAC-CE 612. The configuration controller 640 may transmit the MAC-CE 612 to the UE 104 via the transmitter component 648. The configuration controller 640 may also provide the CORESET 636, search space set 638, active TCI states 656, and DCI format configuration to the DCI generator 642.

The DCI generator 642 may receive an indication of a PDSCH from the scheduler 710. In an aspect, the scheduler 710 may schedule PDSCH transmissions based on a normal QCL capability 712 or a SFN QCL capability 714. The normal QCL capability may indicate a duration of time for the UE 104 to generate a QCL when a DCI indicates a TCI state. The SFN QCL capability 714 may similarly indicate a duration of time for the UE 104 to generate a composite QCL when a DCI indicates two or more TCI states for an SFN transmission. The scheduler 710 may schedule the DCI 622 and PDSCH 630 such that a time difference between the DCI and the PDSCH is at least the duration of the applicable normal QCL capability 712 or a SFN QCL capability 714. The DCI generator 642 may generate a DCI based on the configuration information received from the configuration controller 640 and the schedule information received from the scheduler 710. As discussed above, the DCI 622 may indicate at least two TCI states 624, 626. The DCI 622 may optionally include scheduling information 720 and the DCI bit 521.

The PDSCH generator 644 may generate a PDSCH 630 based on downlink data scheduled for the UE 104. The PDSCH generator 644 may generate OFDM symbols for transmission.

The transmitter component 648 may transmit the PDSCH 630 via at least two TRPs 632, 634. The TRPs 632, 634 may transmit the PDSCH 630 based on a respective TCI state on all DMRS ports or all transmission layers across all resource blocks and symbols for the PDSCH 630.

Figure 8:
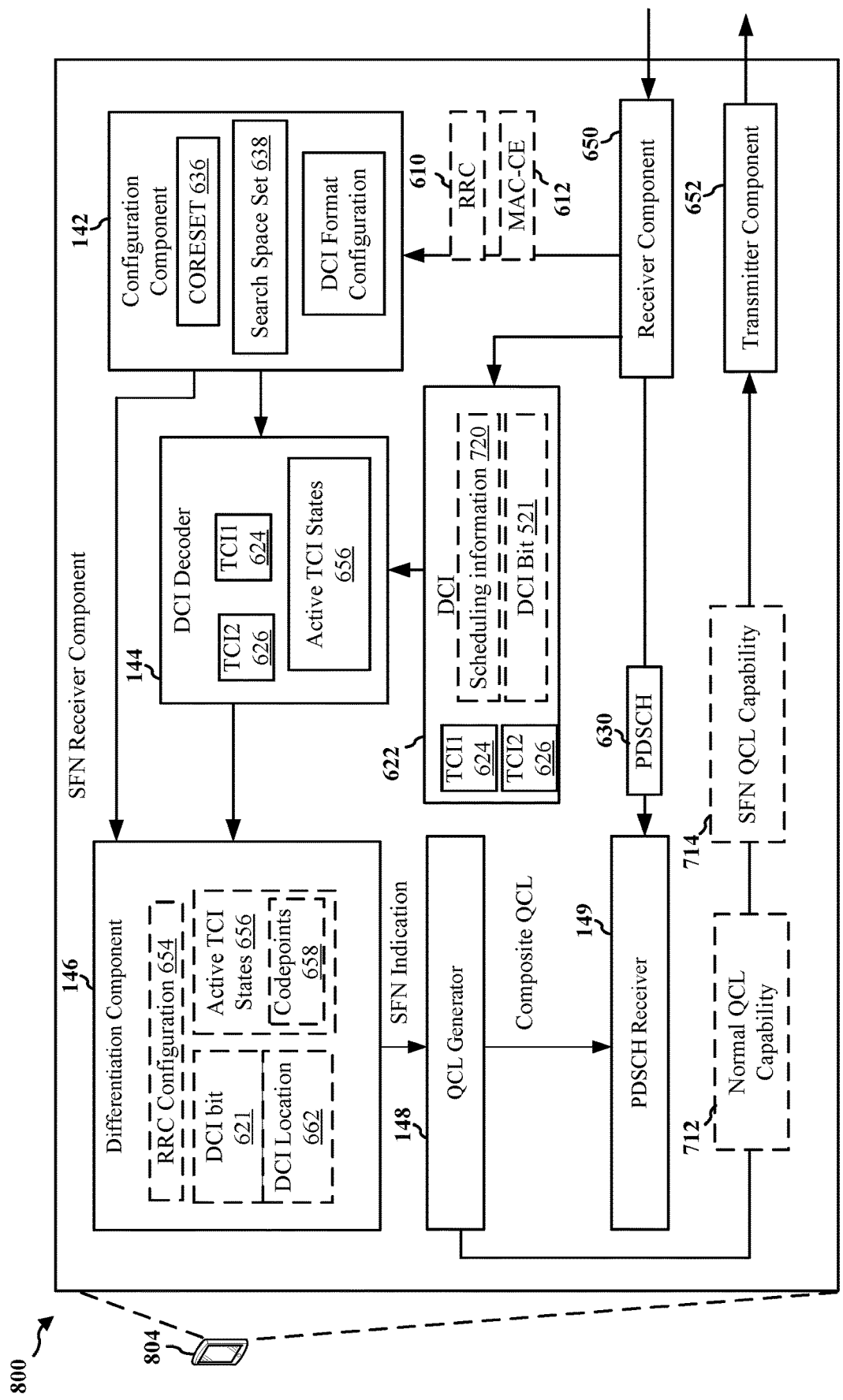
FIG. 8 is a conceptual data flow diagram illustrating the data flow between different means/components in an example UE.

FIG. 8 is a conceptual data flow diagram 800 illustrating the data flow between different means/components in an example UE 804, which may be an example of the UE 104 and include the SFN receiver component 140.

The receiver component 650 may receive downlink signals including RRC message 610, MAC-CE 612, DCI 622, and PDSCH 630. The receiver component 650 may pass configuration messages, such as the RRC message 610 or MAC-CE 612, to the configuration component 142. The receiver component 650 may pass the DCI 622 to the DCI decoder 144. The receiver component 650 may pass the PDSCH 630 to the PDSCH receiver 149.

The configuration component 142 may determine the CORESET 636, search space set 638, and DCI format configuration based on the RRC message 610. The configuration component 142 may also determine the active TCI states 656 and labeled codepoints 658 based on the MAC-CE 612.

The DCI decoder 144 may decode PDCCH candidates based on the configured CORESET 636 and search space set 638 to determine the content of DCI 622. In an aspect, where the CORESET 636 is configured is configured for scheduling PDSCHs with two or more TCI states that apply to all DMRS ports or all transmission layers across all resource blocks and symbols of a respective PDSCH, the DCI 622 may be received with two or more TCI states that apply to a PDCCH DMRS port or a transmission layer across all resource blocks and symbols of the DCI. The DCI decoder 144 may decode PDCCH candidates of the CORESET 636 using a composite QCL derived from two or more reference signals. The DCI decoder 144 determine the at least two indicated TCI states 624 and 626 based on the active TCI states 656. The DCI decoder 144 may provide the differentiation component 146 with the at least two indicated TCI states 624 and 626. The DCI decoder 144 may optionally provide the differentiation component 146 with the DCI location 662, the DCI bit 521, or the TCI codepoint 658.

The differentiation component 146 may differentiate between an SFN transmission and a multiplexed transmission scheduled by the DCI 622 based on one or more of the RRC configuration 654, the DCI bit 621, the DCI location 662, or the label of the codepoint 658 as discussed in detail above. The differentiation component 146 may provide an SFN indication to the QCL generator 148 indicating whether the at least two TCI states 624, 626 apply to all DMRS ports or all transmission layers across all resource blocks and symbols for the PDSCH from TCI states. Additionally, the QCL generator 148 may indicate capabilities such as the normal QCL capability 712 and the SFN QCL capability 714, which may be provided to the transmitter component 652 for transmission as UE capabilities (e.g., via RRC signaling).

The QCL generator 148 may generate the composite QCL (e.g., composite QCL 554) as discussed above based on the at least two TCI states 624, 626 and corresponding reference signals. The QCL generator 148 may provide the composite QCL to the PDSCH receiver 149 for receiving the PDSCH 630 scheduled by the DCI 622. The PDSCH receiver 149 may receive the PDSCH 630 based on the composite QCL.

Figure 10:
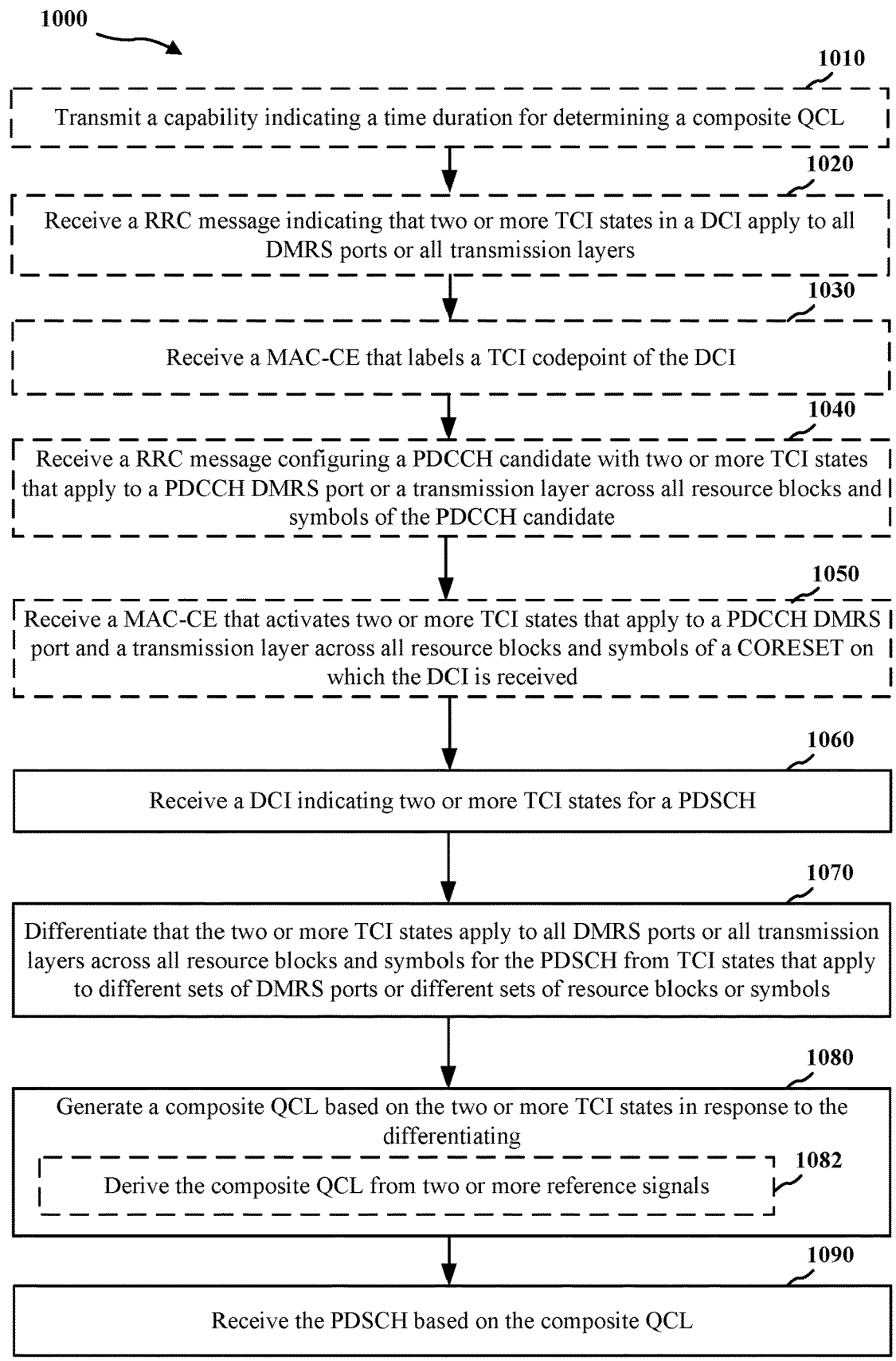
FIG. 10 is a flowchart of an example of a method of wireless communication for a UE.

FIG. 10 is a flowchart of an example method 1000 for receiving an SFN transmission. The method 1000 may be performed by a UE (such as the UE 104, which may include the memory 360 and which may be the entire UE 104 or a component of the UE 104 such as the SFN receiver component 140, TX processor 368, the RX processor 356, or the controller/processor 359). The method 1000 may be performed by the SFN receiver component 140 in communication with the SFN transmitter component 198 of the base station 102.

At block 1010, the method 1000 may optionally include transmitting a capability of the UE indicating a time duration for determining a composite QCL. In an aspect, for example, the UE 104, the TX processor 368 and/or the controller/processor 359 may execute the SFN receiver component 140 and/or the QCL generator 148 to transmit a capability (e.g., SFN QCL capability 714) indicating a time duration for determining the composite QCL. The QCL generator 148 may transmit the capability when a configuration indicates that a DCI can indicate two or more TCI states that apply to all DMRS ports and all transmission layers across all resource blocks and symbols for a PDSCH. The base station 102 may ensure a time duration between the DCI and the PDSCH is at least the indicated time duration. Accordingly, the UE 104, the RX processor 356, and/or the controller/processor 359 executing the SFN receiver component 140 and/or the configuration component 142 may provide means for transmitting a capability indicating a time duration for determining the QCL.

At block 1020, the method 1000 may optionally include receiving a RRC message indicating that two or more TCI states in a DCI apply to all DMRS ports or all transmission layers. In an aspect, for example, the UE 104, the RX processor 356 and/or the controller/processor 359 may execute the SFN receiver component 140 and/or the configuration component 142 to receive the RRC message 610, which may indicate that two or more TCI states in a DCI apply to all DMRS ports or all transmission layers. Accordingly, the UE 104, the RX processor 356, and/or the controller/processor 359 executing the SFN receiver component 140 and/or the configuration component 142 may provide means for receiving a RRC message indicating that two or more TCI states in a DCI apply to all DMRS ports or all transmission layers.

At block 1030, the method 1000 may optionally include receiving a MAC-CE that labels a TCI codepoint of the DCI. In an aspect, for example, the UE 104, the RX processor 356 and/or the controller/processor 359 may execute the SFN receiver component 140 and/or the configuration component 142 to receive a MAC-CE that labels a TCI codepoint of the DCI. The labeled TCI codepoint may indicate that the two or more TCI states apply to all DMRS ports and all transmission layers across all resource blocks and symbols. For example, as discussed above with respect to FIG. 9, a first bit of an octet for a second TCI state may be used as a label indicating whether the codepoint is for SFN transmissions. Accordingly, the UE 104, the RX processor 356, and/or the controller/processor 359 executing the SFN receiver component 140 and/or the configuration component 142 may provide means for receiving a MAC-CE that labels a TCI codepoint of the DCI.

At block 1040, the method 1000 may optionally include receiving a RRC message configuring a PDCCH candidate with two or more TCI states that apply to a PDCCH DMRS port or a transmission layer across all resource blocks and symbols of the PDCCH candidate. In an aspect, for example, the UE 104, the RX processor 356 and/or the controller/processor 359 may execute the SFN receiver component 140 and/or the configuration component 142 to receive the RRC message 610 configuring a PDCCH candidate 620 with two or more TCI states 624,626 that apply to a PDCCH DMRS port or a transmission layer across all resource blocks and symbols of the PDCCH candidate 620. Accordingly, the UE 104, the RX processor 356, and/or the controller/processor 359 executing the SFN receiver component 140 and/or the configuration component 142 may provide means for receiving a RRC message configuring a PDCCH candidate with two or more TCI states that apply to a PDCCH DMRS port or a transmission layer across all resource blocks and symbols of the PDCCH candidate.

At block 1050, the method 1000 may optionally include receiving a MAC-CE that activates two or more TCI states that apply to a PDCCH DMRS port and a transmission layer across all resource blocks and symbols of a CORESET on which the DCI is received. In an aspect, for example, the UE 104, the RX processor 356 and/or the controller/processor 359 may execute the SFN receiver component 140 and/or the configuration component 142 to receive the MAC-CE 612 that activates two or more TCI states that apply to a PDCCH DMRS port and a transmission layer across all resource blocks and symbols of a CORESET on which the DCI is received. Accordingly, the UE 104, the RX processor 356, and/or the controller/processor 359 executing the SFN receiver component 140 and/or the configuration component 142 may provide means for receiving a MAC-CE that activates two or more TCI states that apply to a PDCCH DMRS port and a transmission layer across all resource blocks and symbols of a CORESET on which the DCI is received.

At block 1060, the method 1000 may include receiving a DCI indicating two or more TCI states for a PDSCH. In an aspect, for example, the UE 104, the RX processor 356 and/or the controller/processor 359 may execute the SFN receiver component 140 and/or the DCI decoder 144 to receive the a DCI 622 indicating two or more TCI states 624, 626 for a PDSCH 630. Accordingly, the UE 104, the RX processor 356, and/or the controller/processor 359 executing the SFN receiver component 140 and/or the DCI decoder 144 may provide means for receiving a DCI indicating two or more TCI states for a PDSCH.

At block 1070, the method 1000 may include differentiating that the two or more TCI states apply to all DMRS ports or all transmission layers across all resource blocks and symbols for the PDSCH from TCI states that apply to different sets of DMRS ports or different sets of resource blocks or symbols. In an aspect, for example, the UE 104, the RX processor 356 and/or the controller/processor 359 may execute the SFN receiver component 140 and/or the differentiation component 146 to differentiate that the two or more TCI states 624, 626 apply to all DMRS ports or all transmission layers across all resource blocks and symbols for the PDSCH 630 from TCI states that apply to different sets of DMRS ports or different sets of resource blocks or symbols. That is, the SFN receiver component 140 and/or the differentiation component 146 may differentiate TCI states for a non-transparent SFN transmission from TCI states for multiplexed transmissions. For example, when the RRC message 610 indicates that the two or more TCI states in the DCI apply to all DMRS ports or all transmission layers across all resource blocks and symbols prior to receiving the DCI, the differentiating may be based on the RRC message. As another example, when the MAC-CE 612 labels a TCI codepoint 658 of the DCI 622, the differentiating may be based on the label of the TCI codepoint of the DCI. As another example, the differentiating may be based on a bit of the DCI (e.g., DCI bit 621) that explicitly indicates whether the two or more TCI states apply to all DMRS ports or all transmission layers across all resource blocks and symbols. As another example, when the DCI 622 indicates at least three TCI states 624, 626, 628, the differentiating is based on the three TCI states that apply to all DMRS ports or all transmission layers across all resource blocks and symbols. In another example, when the DCI 622 is received in a CORESET 636 that is configured for scheduling PDSCHs with two or more TCI states that apply to all DMRS ports or all transmission layers across all resource blocks and symbols of a respective PDSCH, the differentiating may be based on the CORESET 636 on which the DCI 622 is received. Accordingly, the UE 104, the RX processor 356, and/or the controller/processor 359 executing the SFN receiver component 140 and/or the differentiation component 146 may provide means for differentiating that the two or more TCI states apply to all DMRS ports or all transmission layers across all resource blocks and symbols for the PDSCH from TCI states that apply to different sets of DMRS ports or different sets of resource blocks or symbols.

At block 1080, the method 1000 may include generating a composite QCL based on the two or more TCI states in response to the differentiating. In an aspect, for example, the UE 104, the RX processor 356 and/or the controller/processor 359 may execute the SFN receiver component 140 and/or the QCL generator 148 to generate a composite QCL 554 based on the two or more TCI states 624,626 in response to the differentiating. For example, at sub-block 1082, the block 1080 may include deriving the composite QCL 554 from two or more reference signals 530, 532. Accordingly, the UE 104, the RX processor 356, and/or the controller/processor 359 executing the SFN receiver component 140 and/or the QCL generator 148 may provide means for generating a composite QCL based on the two or more TCI states in response to the differentiating.

At block 1090, the method 1000 may include receiving the PDSCH based on the composite QCL. In an aspect, for example, the UE 104, the RX processor 356 and/or the controller/processor 359 may execute the SFN receiver component 140 and/or the PDSCH receiver 149 to receive the PDSCH 630 based on the composite QCL 554. Accordingly, the UE 104, the RX processor 356, and/or the controller/processor 359 executing the SFN receiver component 140 and/or the PDSCH receiver 149 may provide means for receiving the PDSCH based on the composite QCL.

Figure 11:
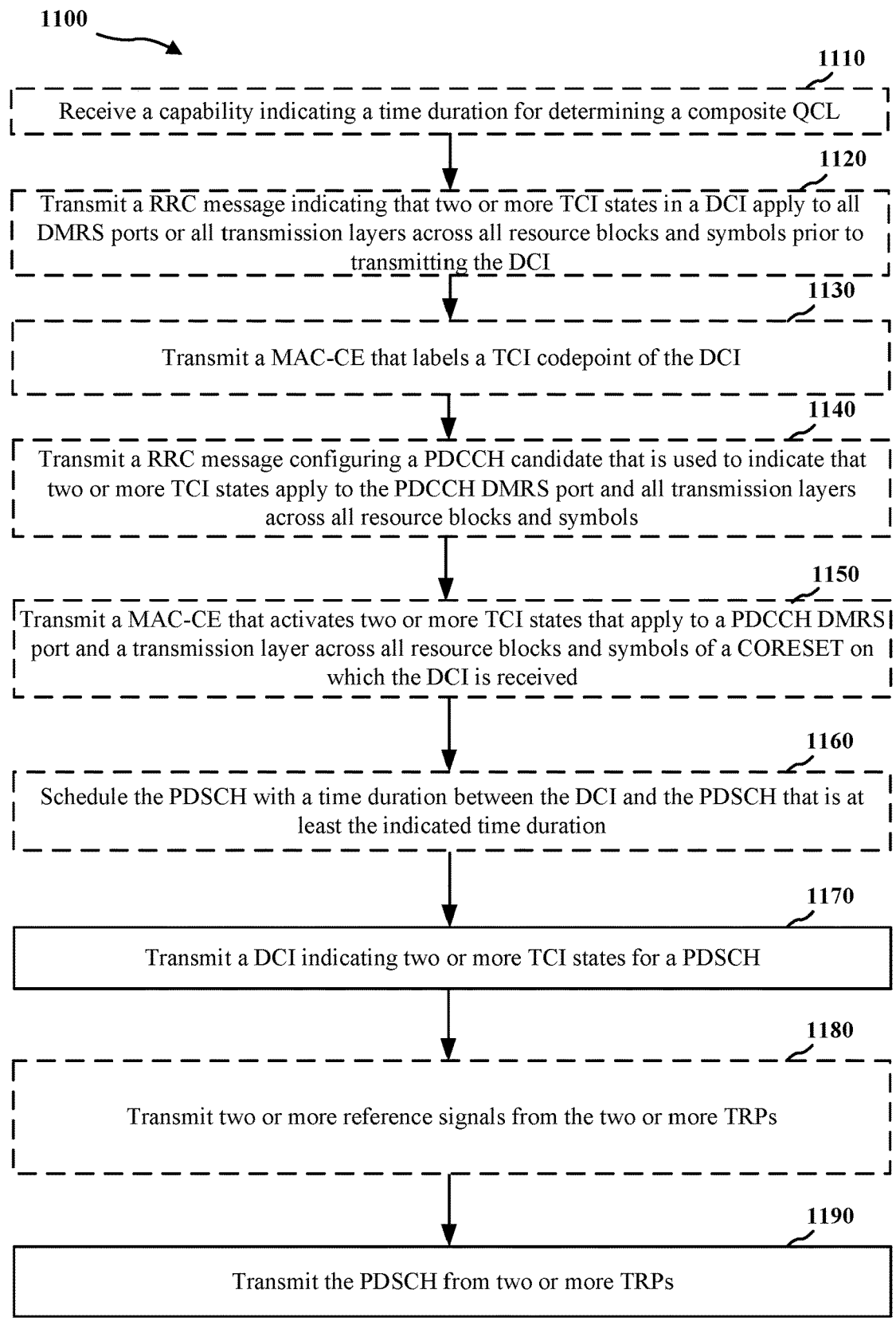
FIG. 11 is a flowchart of an example of a method of wireless communication for a base station.

FIG. 11 is a flowchart of an example method 1100 for transmitting a PDSCH as an SFN transmission. The method 1100 may be performed by a base station (such as the base station 102, which may include the memory 376 and which may be the entire base station 102 or a component of the base station 102 such as the SFN transmitter component 198, TX processor 316, the RX processor 370, or the controller/processor 375). The method 1100 may be performed by the SFN transmitter component 198 in communication with the SFN receiver component 140 of the UE 104.

At block 1110, the method 1100 may optionally include receiving a capability indicating a time duration for determining a composite QCL. In an aspect, for example, the base station 102, the controller/processor 375, and/or the RX processor 370 may execute the SFN transmitter component 198 and/or the scheduler 710 to receive a capability (e.g., SFN QCL capability 714) indicating a time duration for determining a composite QCL 554. Accordingly, the base station 102, the controller/processor 375, and/or the RX processor 370 executing the SFN transmitter component 198 and/or the scheduler 710 may provide means for receiving a capability indicating a time duration for determining a composite QCL.

At block 1120, the method 1100 may optionally include transmitting a RRC message indicating that two or more TCI states in a DCI apply to all DMRS ports or all transmission layers across all resource blocks and symbols prior to transmitting the DCI. In an aspect, for example, the base station 102, the controller/processor 375, and/or the TX processor 316 may execute the SFN transmitter component 198 and/or the configuration controller 640 to transmit a RRC message 610 indicating that two or more TCI states in a DCI apply to all DMRS ports or all transmission layers across all resource blocks and symbols prior to transmitting the DCI. Accordingly, the base station 102, the controller/processor 375, and/or the TX processor 316 executing the SFN transmitter component 198 and/or the configuration controller 640 may provide means for transmitting a RRC message indicating that two or more TCI states in a DCI apply to all DMRS ports or all transmission layers across all resource blocks and symbols prior to transmitting the DCI.

At block 1130, the method 1100 may optionally include transmitting a MAC-CE that labels a TCI codepoint of the DCI. In an aspect, for example, the base station 102, the controller/processor 375, and/or the TX processor 316 may execute the SFN transmitter component 198 and/or the configuration controller 640 to transmit a MAC-CE 612 that labels a TCI codepoint of the DCI, for example, as discussed above with respect to FIG. 9. Accordingly, the base station 102, the controller/processor 375, and/or the TX processor 316 executing the SFN transmitter component 198 and/or the configuration controller 640 may provide means for transmitting a MAC-CE that labels a TCI codepoint of the DCI.

At block 1140, the method 1100 may optionally include transmitting a RRC message configuring a PDCCH candidate that is used to indicate that two or more TCI states apply to the PDCCH DMRS port or all transmission layers across all resource blocks and symbols of the PDCCH candidate. In an aspect, for example, the base station 102, the controller/processor 375, and/or the TX processor 316 may execute the SFN transmitter component 198 and/or the configuration controller 640 to transmit a RRC message 610 configuring a PDCCH candidate 620 that is used to indicate that two or more TCI states 624, 626 apply to the PDCCH DMRS port or all transmission layers across all resource blocks and symbols of the PDCCH candidate 620. Accordingly, the base station 102, the controller/processor 375, and/or the TX processor 316 executing the SFN transmitter component 198 and/or the configuration controller 640 may provide means for transmitting a RRC message configuring a PDCCH candidate that is used to indicate that two or more TCI states apply to the PDCCH DMRS port or all transmission layers across all resource blocks and symbols of the PDCCH candidate.

At block 1150, the method 1100 may optionally include transmitting a MAC-CE that activates two or more TCI states that apply to a PDCCH DMRS port and a transmission layer across all resource blocks and symbols of a CORESET on which the DCI is received. In an aspect, for example, the base station 102, the controller/processor 375, and/or the TX processor 316 may execute the SFN transmitter component 198 and/or the configuration controller 640 to transmit a MAC-CE 612 that activates two or more TCI states that apply to a PDCCH DMRS port and a transmission layer across all resource blocks and symbols of a CORESET 636 on which the DCI is received. Accordingly, the base station 102, the controller/processor 375, and/or the TX processor 316 executing the SFN transmitter component 198 and/or the configuration controller 640 may provide means for transmitting a MAC-CE that activates two or more TCI states that apply to a PDCCH DMRS port and a transmission layer across all resource blocks and symbols of a CORESET on which the DCI is received.

At block 1160, the method 1100 may optionally include scheduling the PDSCH with a time duration between the DCI and the PDSCH that is at least the indicated time duration. In an aspect, for example, the base station 102, the controller/processor 375, and/or the TX processor 316 may execute the SFN transmitter component 198 and/or the scheduler 710 to schedule the PDSCH 630 with a time duration between the DCI 622 and the PDSCH 630 that is at least the indicated time duration (e.g., SFN QCL capability 714. Accordingly, the base station 102, the controller/processor 375, and/or the TX processor 316 executing the SFN transmitter component 198 and/or the configuration controller 640 may provide means for scheduling the PDSCH with a time duration between the DCI and the PDSCH that is at least the indicated time duration.

At block 1170, the method 1100 may include transmitting a DCI indicating two or more TCI states for a PDSCH. In an aspect, for example, the base station 102, the controller/processor 375, and/or the TX processor 316 may execute the SFN transmitter component 198 and/or the DCI generator 642 to transmit a DCI 622 indicating two or more TCI states 624, 626 for a PDSCH 630. The DCI 622 may differentiate that the two or more TCI states apply to all DMRS ports or all transmission layers across all resource blocks and symbols for the PDSCH from TCI states that apply to different sets of DMRS ports or different sets of resource blocks or symbols. Accordingly, the base station 102, the controller/processor 375, and/or the TX processor 316 executing the SFN transmitter component 198 and/or the configuration controller 640 may provide means for transmitting a DCI indicating two or more TCI states for a PDSCH.

At block 1180, the method 1100 may optionally include transmitting two or more reference signals from the two or more TRPs. In an aspect, for example, the base station 102, the controller/processor 375, and/or the TX processor 316 may execute the SFN transmitter component 198 and/or the transmitter component 648 to transmit two or more reference signals from the two or more TRPs 632, 634. Accordingly, the base station 102, the controller/processor 375, and/or the TX processor 316 executing the SFN transmitter component 198 and/or the transmitter component 648 may provide means for transmitting two or more reference signals from the two or more TRPs.

At block 1190, the method 1100 may include transmitting the PDSCH from two or more TRPs. In an aspect, for example, the base station 102, the controller/processor 375, and/or the TX processor 316 may execute the SFN transmitter component 198 and/or the PDSCH generator 644 to transmit the PDSCH 630 from two or more TRPs 632, 634. Each of the TRPs 632, 634 corresponds to one of the TCI states 624, 626. Accordingly, the base station 102, the controller/processor 375, and/or the TX processor 316 executing the SFN transmitter component 198 and/or the PDSCH generator 644 may provide means for transmitting the PDSCH from two or more TRPs.

Figure 12:
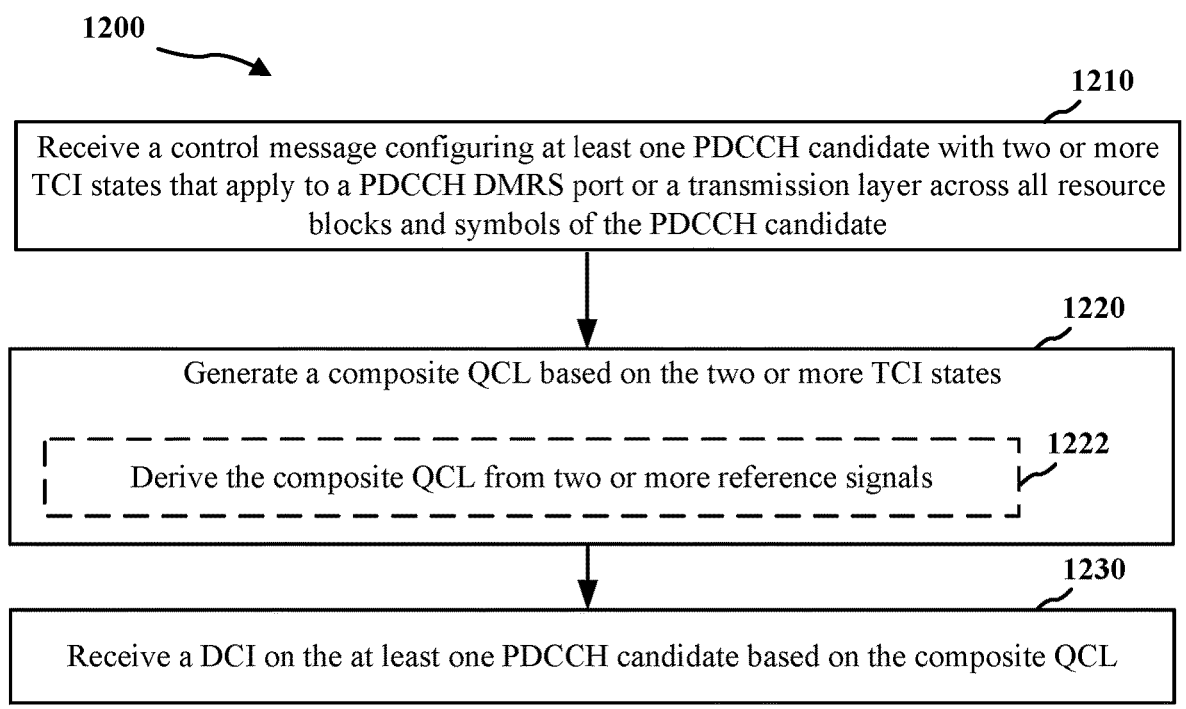
FIG. 12 is a flowchart of an example of a method of wireless communication for a UE to receive a downlink control information (DCI) using a composite quasi-co location (QCL).

FIG. 12 is a flowchart of an example of a method 1200 of wireless communication for a UE to receive a DCI using a composite QCL. The method 1200 may be performed by a UE (such as the UE 104, which may include the memory 360 and which may be the entire UE 104 or a component of the UE 104 such as the SFN receiver component 140, TX processor 368, the RX processor 356, or the controller/processor 359). The method 1200 may be performed by the SFN receiver component 140 in communication with the SFN transmitter component 198 of the base station 102.

At block 1210, the method 1200 may include receiving a control message configuring a PDCCH candidate with two or more TCI states that apply to a PDCCH DMRS port or a transmission layer across all resource blocks and symbols of the PDCCH candidate. In an aspect, for example, the UE 104, the RX processor 356 and/or the controller/processor 359 may execute the SFN receiver component 140 and/or the configuration component 142 to receive the RRC message 610 configuring a PDCCH candidate 620 with two or more TCI states 624,626 that apply to a PDCCH DMRS port or a transmission layer across all resource blocks and symbols of the PDCCH candidate 620. As another example, the UE 104, the RX processor 356 and/or the controller/processor 359 may execute the SFN receiver component 140 and/or the configuration component 142 to receive the MAC-CE 612 that activates two or more TCI states that apply to a PDCCH DMRS port and a transmission layer across all resource blocks and symbols of a CORESET on which the DCI is received. Accordingly, the UE 104, the RX processor 356, and/or the controller/processor 359 executing the SFN receiver component 140 and/or the configuration component 142 may provide means for receiving a control message configuring a PDCCH candidate with two or more TCI states that apply to a PDCCH DMRS port or a transmission layer across all resource blocks and symbols of the PDCCH candidate.

At block 1220, the method 1000 may include determining a composite QCL based on the two or more TCI states. In an aspect, for example, the UE 104, the RX processor 356 and/or the controller/processor 359 may execute the SFN receiver component 140 and/or the QCL generator 148 to determining the composite QCL based on the two or more TCI states. For example, at sub-block 1222, the block 1220 may include deriving the composite QCL from two or more reference signals. Each of the two or more reference signals may be associated with one of the two or more TCI states. Accordingly, the UE 104, the RX processor 356, and/or the controller/processor 359 executing the SFN receiver component 140 and/or the QCL generator 148 may provide means for determining a composite QCL based on the two or more TCI states.

At block 1230, the method 1200 may include receiving a DCI on the at least one PDCCH candidate based on the composite QCL. In an aspect, for example, the UE 104, the RX processor 356 and/or the controller/processor 359 may execute the SFN receiver component 140 and/or the DCI decoder 144 to receive the DCI 622 based on the composite QCL 554. Accordingly, the UE 104, the RX processor 356, and/or the controller/processor 359 executing the SFN receiver component 140 and/or the PDSCH receiver 149 may provide means for receiving a DCI on the at least one PDCCH candidate based on the composite QCL.

Some Further Example Clauses

Implementation examples are described in the following numbered clauses:

1. A method of wireless communication, comprising:
receiving a downlink control information (DCI) indicating two or more transmission configuration indication (TCI) states for a physical downlink shared channel (PDSCH);
differentiating that the two or more TCI states apply to all demodulation reference signal (DMRS) ports or all transmission layers across all resource blocks and symbols for the PDSCH from TCI states that apply to different sets of DMRS ports or different sets of resource blocks or symbols;
determining a composite quasi-co-location (QCL) based on the two or more TCI states in response to the differentiating; and
receiving the PDSCH based on the composite QCL.

2. The method of clause 1, further comprising receiving a radio resource control (RRC) message indicating that the two or more TCI states in the DCI apply to all DMRS ports or all transmission layers across all resource blocks and symbols prior to receiving the DCI, wherein the differentiating is based on the RRC message.

3. The method of clause 1 or clause 2, further comprising receiving a media access control (MAC) control element (CE) that labels a TCI codepoint of the DCI, wherein the labeled TCI codepoint indicates the two or more TCI states that apply to all DMRS ports or all transmission layers across all resource blocks and symbols, wherein the differentiating is based on the label of the TCI codepoint of the DCI.

4. The method of any of clauses 1-3, wherein the differentiating is based on a bit of the DCI that explicitly indicates whether the two or more TCI states apply to all DMRS ports or all transmission layers across all resource blocks and symbols.

5. The method of any of clauses 1-4, wherein the DCI indicates at least three TCI states, wherein the differentiating is based on the three TCI states that apply to all DMRS ports or all transmission layers across all resource blocks and symbols.

6. The method of any of clauses 1-5, wherein the DCI is received in a CORESET that is configured for scheduling PDSCHs with two or more TCI states that apply to all DMRS ports or all transmission layers across all resource blocks and symbols of a respective PDSCH, wherein the differentiating is based on the CORESET on which the DCI is received.

7. The method of clause 6, wherein the DCI is received with two or more TCI states that apply to a physical downlink control channel (PDCCH) DMRS port or a transmission layer across all resource blocks and symbols of the DCI.

8. The method of clause 7, wherein the two or more TCI states that apply to all DMRS ports or all transmission layers across all resource blocks and symbols for the PDSCH are the same as the two or more TCI states that apply to the PDCCH DMRS port or all transmission layers across all resource blocks and symbols of the DCI.

9. The method of clause 7 or clause 8, wherein the DCI includes a TCI field that indicates the two or more TCI states that apply to all DMRS ports or all transmission layers across all resource blocks and symbols for the PDSCH.

10. The method of any of clauses 1-9, further comprising receiving a RRC message configuring a PDCCH candidate with two or more TCI states that apply to a PDCCH DMRS port or a transmission layer across all resource blocks and symbols of the PDCCH candidate.

11. The method of clause 10, wherein the RRC message is for: one or more PDCCH candidates, all PDCCH candidates in a search space set, or all PDCCH candidates in all search space sets associated with a CORESET.

12. The method of any of clauses 1-11, further comprising receiving a MAC-CE that activates two or more TCI states that apply to a PDCCH DMRS port or a transmission layer across all resource blocks and symbols of a CORESET on which the DCI is received.

13. The method of any of clauses 1-12, wherein determining the composite QCL comprises deriving the composite QCL from two or more reference signals, wherein each of the two or more reference signals is associated with one of the two or more TCI states.

14. The method of any of clauses 1-13, further comprising transmitting a capability indicating a time duration for determining the composite QCL when a configuration indicates that a DCI can indicate two or more TCI states that apply to all DMRS ports or all transmission layers across all resource blocks and symbols for a PDSCH, wherein a time duration between the DCI and the PDSCH is at least the indicated time duration.

15. A method of wireless communication, comprising:
transmitting a downlink control information (DCI) indicating two or more transmission configuration indication (TCI) states for a physical downlink shared channel (PDSCH), wherein the DCI differentiates that the two or more TCI states apply to all demodulation reference signal (DMRS) ports or all transmission layers across all resource blocks and symbols for the PDSCH from TCI states that apply to different sets of DMRS ports or different sets of resource blocks or symbols; and
transmitting the PDSCH from two or more transmit receive points (TRPs), wherein each of the TRPs corresponds to one of the TCI states.

16. The method of clause 15, further comprising transmitting a radio resource control (RRC) message indicating that the or more two TCI states in the DCI apply to all DMRS ports or all transmission layers across all resource blocks and symbols prior to transmitting the DCI.

17. The method of clause 15 or clause 16, further comprising transmitting a media access control (MAC) control element (CE) that labels a TCI codepoint of the DCI, wherein the labeled TCI codepoint indicates the two or more TCI states that apply to all DMRS ports or all transmission layers across all resource blocks and symbols.

18. The method of any of clauses 15-17, wherein a bit of the DCI explicitly indicates whether the two or more TCI states apply to all DMRS ports or all transmission layers across all resource blocks and symbols.

19. The method of any of clauses 15-18, wherein the DCI indicates at least three TCI states that apply to all DMRS ports or all transmission layers across all resource blocks and symbols.

20. The method of any of clauses 15-19, wherein the DCI is transmitted in a CORESET that is configured for scheduling PDSCHs with two or more TCI states that apply to all DMRS ports or all transmission layers across all resource blocks and symbols of a respective PDSCH.

21. The method of clause 20, wherein the DCI is transmitted with two or more TCI states that apply to a physical downlink control channel (PDCCH) DMRS port and a transmission layer across all resource blocks and symbols of the DCI.

22. The method of clause 21, wherein the two or more TCI states that apply to all DMRS ports or all transmission layers across all resource blocks and symbols for the PDSCH are the same as the two or more TCI states that apply to the DMRS ports and the transmission layer across all resource blocks and symbols of the DCI.

23. The method of clause 21 or clause 22, wherein the DCI includes a TCI field that indicates the two or more TCI states that apply to all DMRS ports or all transmission layers across all resource blocks and symbols for the PDSCH.

24. The method of any of clauses 15-23, further comprising transmitting a RRC message configuring a PDCCH candidate with two or more TCI states that apply to a PDCCH DMRS port and a transmission layer across all resource blocks and symbols of the PDCCH candidate.

25. The method of clause 24, wherein the RRC message is for: one or more PDCCH candidates, all PDCCH candidates in a search space set, or all PDCCH candidates in all search space sets associated with a CORESET.

26. The method of any of clauses 15-25, further comprising transmitting a MAC-CE that activates two or more TCI states that apply to a PDCCH DMRS port and a transmission layer across all resource blocks and symbols of a CORESET on which the DCI is received.

27. The method of any of clauses 15-26, further comprising transmitting two or more reference signals from the two or more TRPs, wherein each of the two or more reference signals is associated with one of the two or more TCI states.

28. The method of any of clauses 15-27, further comprising receiving a capability indicating a time duration for determining a quasi-co-location (QCL) when a configuration indicates that a DCI can indicate two or more TCI states that apply to all DMRS ports or all transmission layers across all resource blocks and symbols for a PDSCH, further comprising scheduling the PDSCH with a time duration between the DCI and the PDSCH that is at least the indicated time duration.

29. An apparatus for wireless communication, comprising:
a memory storing computer-executable instructions; and
at least one processor coupled to the memory and configured to execute the computer-executable instructions to:
receive a downlink control information (DCI) indicating two or more transmission configuration indication (TCI) states for a physical downlink shared channel (PDSCH);
differentiate that the two or more TCI states apply to all demodulation reference signal (DMRS) ports or all transmission layers across all resource blocks and symbols for the PDSCH from TCI states that apply to different sets of DMRS ports or different sets of resource blocks or symbols;
determine a composite quasi-co-location (QCL) based on the two or more TCI states in response to the differentiating; and
receive the PDSCH based on the composite QCL.

30. The apparatus of clause 29, wherein the at least one processor is configured to receive a radio resource control (RRC) message indicating that the two or more TCI states in the DCI apply to all DMRS ports or all transmission layers across all resource blocks and symbols prior to receiving the DCI, wherein the at least one processor is configured to differentiate based on the RRC message.

31. The apparatus of clause 29 or clause 30, wherein the at least one processor is configured to receive a media access control (MAC) control element (CE) that labels a TCI codepoint of the DCI, wherein the labeled TCI codepoint indicates the two or more TCI states that apply to all DMRS ports or all transmission layers across all resource blocks and symbols, wherein the at least one processor is configured to differentiate based on the label of the TCI codepoint of the DCI.

32. The apparatus of any of clauses 29-31, wherein the at least one processor is configured to differentiate based on a bit of the DCI that explicitly indicates whether the two or more TCI states apply to all DMRS ports or all transmission layers across all resource blocks and symbols.

33. The apparatus of any of clauses 29-32, wherein the DCI indicates at least three TCI states, wherein the differentiating is based on the three TCI states that apply to all DMRS ports or all transmission layers across all resource blocks and symbols.

34. The apparatus of any of clauses 29-33, wherein the DCI is received in a CORESET that is configured for scheduling PDSCHs with two or more TCI states that apply to all DMRS ports or all transmission layers across all resource blocks and symbols of a respective PDSCH, wherein the at least one processor is configured to differentiate based on the CORESET on which the DCI is received.

35. The apparatus of any of clauses 29-34, wherein the DCI is received with two or more TCI states that apply to a physical downlink control channel (PDCCH) DMRS port or a transmission layer across all resource blocks and symbols of the DCI.

36. The apparatus of clause 35, wherein the two or more TCI states that apply to all DMRS ports or all transmission layers across all resource blocks and symbols for the PDSCH are the same as the two or more TCI states that apply to the PDCCH DMRS port or all transmission layers across all resource blocks and symbols of the DCI.

37. The apparatus of clause 35 or clause 36, wherein the DCI includes a TCI field that indicates the two or more TCI states that apply to all DMRS ports or all transmission layers across all resource blocks and symbols for the PDSCH.

38. The apparatus of any of clauses 29-37, wherein the at least one processor is configured to receive a RRC message configuring a PDCCH candidate with two or more TCI states that apply to a PDCCH DMRS port or a transmission layer across all resource blocks and symbols of the PDCCH candidate.

39. The apparatus of clause 38, wherein the RRC message is for: one or more PDCCH candidates, all PDCCH candidates in a search space set, or all PDCCH candidates in all search space sets associated with a CORESET.

40. The apparatus of any of clauses 29-39, wherein the at least one processor is configured to receive a MAC-CE that activates two or more TCI states that apply to a PDCCH DMRS port or a transmission layer across all resource blocks and symbols of a CORESET on which the DCI is received.

41. The apparatus of any of clauses 29-40, wherein the at least one processor is configured to derive the composite QCL from two or more reference signals, wherein each of the two or more reference signals is associated with one of the two or more TCI states.

42. The apparatus of any of clauses 29-41, wherein the at least one processor is configured to transmit a capability indicating a time duration for determining the composite QCL when a configuration indicates that a DCI can indicate two or more TCI states that apply to all DMRS ports or all transmission layers across all resource blocks and symbols for a PDSCH, wherein a time duration between the DCI and the PDSCH is at least the indicated time duration.

43. An apparatus for wireless communication, comprising:
a memory storing computer-executable instructions; and
at least one processor coupled to the memory and configured to execute the computer-executable instructions to:
transmit a downlink control information (DCI) indicating two or more transmission configuration indication (TCI) states for a physical downlink shared channel (PDSCH), wherein the DCI differentiates that the two or more TCI states apply to all demodulation reference signal (DMRS) ports or all transmission layers across all resource blocks and symbols for the PDSCH from TCI states that apply to different sets of DMRS ports or different sets of resource blocks or symbols; and
transmit the PDSCH from two or more transmit receive points (TRPs), wherein each of the TRPs corresponds to one of the TCI states.

44. The apparatus of clause 43, wherein the at least one processor is configured to transmit a radio resource control (RRC) message indicating that the or more two TCI states in the DCI apply to all DMRS ports or all transmission layers across all resource blocks and symbols prior to transmitting the DCI.

45. The apparatus of clause 43 of clause 44, wherein the at least one processor is configured to transmit a media access control (MAC) control element (CE) that labels a TCI codepoint of the DCI, wherein the labeled TCI codepoint indicates the two or more TCI states that apply to all DMRS ports or all transmission layers across all resource blocks and symbols.

46. The apparatus of any of clauses 43-45, wherein a bit of the DCI explicitly indicates whether the two or more TCI states apply to all DMRS ports or all transmission layers across all resource blocks and symbols.

47. The apparatus of any of clauses 43-46, wherein the DCI indicates at least three TCI states that apply to all DMRS ports or all transmission layers across all resource blocks and symbols.

48. The apparatus of any of clauses 43-47, wherein the DCI is transmitted in a CORESET that is configured for scheduling PDSCHs with two or more TCI states that apply to all DMRS ports or all transmission layers across all resource blocks and symbols of a respective PDSCH.

49. The apparatus of any of clauses 43-48, wherein the DCI is transmitted with two or more TCI states that apply to a physical downlink control channel (PDCCH) DMRS port and a transmission layer across all resource blocks and symbols of the DCI.

50. The apparatus of clause 49, wherein the two or more TCI states that apply to all DMRS ports or all transmission layers across all resource blocks and symbols for the PDSCH are the same as the two or more TCI states that apply to the DMRS ports and the transmission layer across all resource blocks and symbols of the DCI.

51. The apparatus of clause 49 or clause 50, wherein the DCI includes a TCI field that indicates the two or more TCI states that apply to all DMRS ports or all transmission layers across all resource blocks and symbols for the PDSCH.

52. The apparatus of any of clauses 43-51, wherein the at least one processor is configured to transmit a RRC message configuring a PDCCH candidate with two or more TCI states that apply to a PDCCH DMRS port and a transmission layer across all resource blocks and symbols of the PDCCH candidate.

53. The apparatus of clause 52, wherein the RRC message is for: one or more PDCCH candidates, all PDCCH candidates in a search space set, or all PDCCH candidates in all search space sets associated with a CORESET.

54. The apparatus of any of clauses 43-53, wherein the at least one processor is configured to transmit a MAC-CE that activates two or more TCI states that apply to a PDCCH DMRS port and a transmission layer across all resource blocks and symbols of a CORESET on which the DCI is received.

55. The apparatus of any of clauses 43-54, wherein the at least one processor is configured to transmit two or more reference signals from the two or more TRPs, wherein each of the two or more reference signals is associated with one of the two or more TCI states.

56. The apparatus of any of clauses 43-55, wherein the at least one processor is configured to receive a capability indicating a time duration for determining a quasi-co-location (QCL) when a configuration indicates that a DCI can indicate two or more TCI states that apply to all DMRS ports or all transmission layers across all resource blocks and symbols for a PDSCH, further comprising scheduling the PDSCH with a time duration between the DCI and the PDSCH that is at least the indicated time duration.

57. An apparatus for wireless communication, comprising:
means for receiving a downlink control information (DCI) indicating two or more transmission configuration indication (TCI) states for a physical downlink shared channel (PDSCH);
means for differentiating that the two or more TCI states apply to all demodulation reference signal (DMRS) ports or all transmission layers across all resource blocks and symbols for the PDSCH from TCI states that apply to different sets of DMRS ports or different sets of resource blocks or symbols;
means for determining a composite quasi-co-location (QCL) based on the two or more TCI states in response to the differentiating; and
means for receiving the PDSCH based on the composite QCL.

58. The apparatus of clause 57, further comprising means for receiving a radio resource control (RRC) message indicating that the two or more TCI states in the DCI apply to all DMRS ports or all transmission layers across all resource blocks and symbols prior to receiving the DCI, wherein the differentiating is based on the RRC message.

59. The apparatus of clause 57 or clause 58, further comprising means for receiving a media access control (MAC) control element (CE) that labels a TCI codepoint of the DCI, wherein the labeled TCI codepoint indicates the two or more TCI states that apply to all DMRS ports or all transmission layers across all resource blocks and symbols, wherein the differentiating is based on the label of the TCI codepoint of the DCI.

60. The apparatus of any of clauses 57-59, wherein the means for differentiating is configured to differentiate based on a bit of the DCI that explicitly indicates whether the two or more TCI states apply to all DMRS ports or all transmission layers across all resource blocks and symbols.

61. The apparatus of any of clauses 57-60, wherein the DCI indicates at least three TCI states, wherein the differentiating is based on the three TCI states that apply to all DMRS ports or all transmission layers across all resource blocks and symbols.

62. The apparatus of any of clauses 57-61, wherein the DCI is received in a CORESET that is configured for scheduling PDSCHs with two or more TCI states that apply to all DMRS ports or all transmission layers across all resource blocks and symbols of a respective PDSCH, wherein the differentiating is based on the CORESET on which the DCI is received.

63. The apparatus of clause 62, wherein the DCI is received with two or more TCI states that apply to a physical downlink control channel (PDCCH) DMRS port or a transmission layer across all resource blocks and symbols of the DCI.

64. The apparatus of clause 63, wherein the two or more TCI states that apply to all DMRS ports or all transmission layers across all resource blocks and symbols for the PDSCH are the same as the two or more TCI states that apply to the PDCCH DMRS port or all transmission layers across all resource blocks and symbols of the DCI.

65. The apparatus of clause 63 or clause 64, wherein the DCI includes a TCI field that indicates the two or more TCI states that apply to all DMRS ports or all transmission layers across all resource blocks and symbols for the PDSCH.

66. The apparatus of any of clauses 57-65, further comprising means for receiving a RRC message that configures a PDCCH candidate with two or more TCI states that apply to a PDCCH DMRS port or a transmission layer across all resource blocks and symbols of the PDCCH candidate.

67. The apparatus of clause 66, wherein the RRC message is for: one or more PDCCH candidates, all PDCCH candidates in a search space set, or all PDCCH candidates in all search space sets associated with a CORESET.

68. The apparatus of any of clauses 57-67, further comprising means for receiving a MAC-CE that activates two or more TCI states that apply to a PDCCH DMRS port or a transmission layer across all resource blocks and symbols of a CORESET on which the DCI is received.

69. The apparatus of any of clauses 57-68, wherein the means for determining the composite QCL is configured to derive the composite QCL from two or more reference signals, wherein each of the two or more reference signals is associated with one of the two or more TCI states.

70. The apparatus of any of clauses 57-69, further comprising means for transmitting a capability indicating a time duration for determining the composite QCL when a configuration indicates that a DCI can indicate two or more TCI states that apply to all DMRS ports or all transmission layers across all resource blocks and symbols for a PDSCH, wherein a time duration between the DCI and the PDSCH is at least the indicated time duration.

71. An apparatus for wireless communication, comprising:
means for transmitting a downlink control information (DCI) indicating two or more transmission configuration indication (TCI) states for a physical downlink shared channel (PDSCH), wherein the DCI differentiates that the two or more TCI states apply to all demodulation reference signal (DMRS) ports or all transmission layers across all resource blocks and symbols for the PDSCH from TCI states that apply to different sets of DMRS ports or different sets of resource blocks or symbols; and
means for transmitting the PDSCH from two or more transmit receive points (TRPs), wherein each of the TRPs corresponds to one of the TCI states.

72. The apparatus of clause 71, further comprising means for transmitting a radio resource control (RRC) message indicating that the or more two TCI states in the DCI apply to all DMRS ports or all transmission layers across all resource blocks and symbols prior to transmitting the DCI.

73. The apparatus of clause 71 or clause 72, further comprising means for transmitting a media access control (MAC) control element (CE) that labels a TCI codepoint of the DCI, wherein the labeled TCI codepoint indicates the two or more TCI states that apply to all DMRS ports or all transmission layers across all resource blocks and symbols.

74. The apparatus of any of clauses 71-73, wherein a bit of the DCI explicitly indicates whether the two or more TCI states apply to all DMRS ports or all transmission layers across all resource blocks and symbols.

75. The apparatus of any of clauses 71-74, wherein the DCI indicates at least three TCI states that apply to all DMRS ports or all transmission layers across all resource blocks and symbols.

76. The apparatus of any of clauses 71-75, wherein the DCI is transmitted in a CORESET that is configured for scheduling PDSCHs with two or more TCI states that apply to all DMRS ports or all transmission layers across all resource blocks and symbols of a respective PDSCH.

77. The apparatus of any of clauses 71-76, wherein the DCI is transmitted with two or more TCI states that apply to a physical downlink control channel (PDCCH) DMRS port and a transmission layer across all resource blocks and symbols of the DCI.

78. The apparatus of clause 77, wherein the two or more TCI states that apply to all DMRS ports or all transmission layers across all resource blocks and symbols for the PDSCH are the same as the two or more TCI states that apply to the DMRS ports and the transmission layer across all resource blocks and symbols of the DCI.

79. The apparatus of clause 77 or clause 78, wherein the DCI includes a TCI field that indicates the two or more TCI states that apply to all DMRS ports or all transmission layers across all resource blocks and symbols for the PDSCH.

80. The apparatus of any of clauses 71-79, further comprising means for transmitting a RRC message configuring a PDCCH candidate with two or more TCI states that apply to a PDCCH DMRS port and a transmission layer across all resource blocks and symbols of the PDCCH candidate.

81. The apparatus of clause 80, wherein the RRC message is for: one or more PDCCH candidates, all PDCCH candidates in a search space set, or all PDCCH candidates in all search space sets associated with a CORESET.

82. The apparatus of any of clauses 71-81, further comprising means for transmitting a MAC-CE that activates two or more TCI states that apply to a PDCCH DMRS port and a transmission layer across all resource blocks and symbols of a CORESET on which the DCI is received.

83. The apparatus of any of clauses 71-82, further comprising means for transmitting two or more reference signals from the two or more TRPs, wherein each of the two or more reference signals is associated with one of the two or more TCI states.

84. The apparatus of any of clauses 71-83, further comprising means for receiving a capability indicating a time duration for determining a quasi-co-location (QCL) when a configuration indicates that a DCI can indicate two or more TCI states that apply to all DMRS ports or all transmission layers across all resource blocks and symbols for a PDSCH, further comprising scheduling the PDSCH with a time duration between the DCI and the PDSCH that is at least the indicated time duration.

85. A non-transitory computer-readable medium storing computer executable code, the code when executed by a processor causes the processor to:
receive a downlink control information (DCI) indicating two or more transmission configuration indication (TCI) states for a physical downlink shared channel (PDSCH);
differentiate that the two or more TCI states apply to all demodulation reference signal (DMRS) ports or all transmission layers across all resource blocks and symbols for the PDSCH from TCI states that apply to different sets of DMRS ports or different sets of resource blocks or symbols;
determine a composite quasi-co-location (QCL) based on the two or more TCI states in response to the differentiating; and
receive the PDSCH based on the composite QCL.

86. The non-transitory computer-readable medium of clause 85, further comprising code to receive a radio resource control (RRC) message indicating that the two or more TCI states in the DCI apply to all DMRS ports or all transmission layers across all resource blocks and symbols prior to receiving the DCI, wherein the code to differentiate comprises code to differentiate based on the RRC message.

87. The non-transitory computer-readable medium of clause 85 or clause 86, further comprising code to receive a media access control (MAC) control element (CE) that labels a TCI codepoint of the DCI, wherein the labeled TCI codepoint indicates the two or more TCI states that apply to all DMRS ports or all transmission layers across all resource blocks and symbols, wherein the code to differentiate comprises code to differentiate based on the label of the TCI codepoint of the DCI.

88. The non-transitory computer-readable medium of any of clauses 85-87, further comprising code to differentiate based on a bit of the DCI that explicitly indicates whether the two or more TCI states apply to all DMRS ports or all transmission layers across all resource blocks and symbols.

89. The non-transitory computer-readable medium of any of clauses 85-88, wherein the DCI indicates at least three TCI states, wherein the differentiating is based on the three TCI states that apply to all DMRS ports or all transmission layers across all resource blocks and symbols.

90. The non-transitory computer-readable medium of any of clauses 85-89, wherein the DCI is received in a CORESET that is configured for scheduling PDSCHs with two or more TCI states that apply to all DMRS ports or all transmission layers across all resource blocks and symbols of a respective PDSCH, wherein the code to differentiate comprises code to differentiate based on the CORESET on which the DCI is received.

91. The non-transitory computer-readable medium of clause 90, wherein the DCI is received with two or more TCI states that apply to a physical downlink control channel (PDCCH) DMRS port or a transmission layer across all resource blocks and symbols of the DCI.

92. The non-transitory computer-readable medium of clause 91, wherein the two or more TCI states that apply to all DMRS ports or all transmission layers across all resource blocks and symbols for the PDSCH are the same as the two or more TCI states that apply to the PDCCH DMRS port or all transmission layers across all resource blocks and symbols of the DCI.

93. The non-transitory computer-readable medium of clause 91 or clause 92, wherein the DCI includes a TCI field that indicates the two or more TCI states that apply to all DMRS ports or all transmission layers across all resource blocks and symbols for the PDSCH.

94. The non-transitory computer-readable medium of any of clauses 85-93, further comprising code to receive a RRC message configuring a PDCCH candidate with two or more TCI states that apply to a PDCCH DMRS port or a transmission layer across all resource blocks and symbols of the PDCCH candidate.

95. The non-transitory computer-readable medium of clause 94, wherein the RRC message is for: one or more PDCCH candidates, all PDCCH candidates in a search space set, or all PDCCH candidates in all search space sets associated with a CORESET.

96. The non-transitory computer-readable medium of any of clauses 85-95, further comprising code to receive a MAC-CE that activates two or more TCI states that apply to a PDCCH DMRS port or a transmission layer across all resource blocks and symbols of a CORESET on which the DCI is received.

97. The non-transitory computer-readable medium of any of clauses 85-96, further comprising code to derive the composite QCL from two or more reference signals, wherein each of the two or more reference signals is associated with one of the two or more TCI states.

98. The non-transitory computer-readable medium of any of clauses 85-97, further comprising code to transmit a capability indicating a time duration for determining the composite QCL when a configuration indicates that a DCI can indicate two or more TCI states that apply to all DMRS ports or all transmission layers across all resource blocks and symbols for a PDSCH, wherein a time duration between the DCI and the PDSCH is at least the indicated time duration.

99. A non-transitory computer-readable medium storing computer executable code, the code when executed by a processor causes the processor to:
 transmit a downlink control information (DCI) indicating two or more transmission configuration indication (TCI) states for a physical downlink shared channel (PDSCH), wherein the DCI differentiates that the two or more TCI states apply to all demodulation reference signal (DMRS) ports or all transmission layers across all resource blocks and symbols for the PDSCH from TCI states that apply to different sets of DMRS ports or different sets of resource blocks or symbols; and
 transmit the PDSCH from two or more transmit receive points (TRPs), wherein each of the TRPs corresponds to one of the TCI states.

100. The non-transitory computer-readable medium of clause 99, further comprising code to transmit a radio resource control (RRC) message indicating that the or more two TCI states in the DCI apply to all DMRS ports or all transmission layers across all resource blocks and symbols prior to transmitting the DCI.

101. The non-transitory computer-readable medium of clause 99 or clause 100, further comprising code to transmit a media access control (MAC) control element (CE) that labels a TCI codepoint of the DCI, wherein the labeled TCI codepoint indicates the two or more TCI states that apply to all DMRS ports or all transmission layers across all resource blocks and symbols.

102. The non-transitory computer-readable medium of any of clauses 99-101, wherein a bit of the DCI explicitly indicates whether the two or more TCI states apply to all DMRS ports or all transmission layers across all resource blocks and symbols.

103. The non-transitory computer-readable medium of any of clauses 99-102, wherein the DCI indicates at least three TCI states that apply to all DMRS ports or all transmission layers across all resource blocks and symbols.

104. The non-transitory computer-readable medium of any of clauses 99-103, wherein the DCI is transmitted in a CORESET that is configured for scheduling PDSCHs with two or more TCI states that apply to all DMRS ports or all transmission layers across all resource blocks and symbols of a respective PDSCH.

105. The non-transitory computer-readable medium of clause 104, wherein the DCI is transmitted with two or more TCI states that apply to a physical downlink control channel (PDCCH) DMRS port and a transmission layer across all resource blocks and symbols of the DCI.

106. The non-transitory computer-readable medium of clause 105, wherein the two or more TCI states that apply to all DMRS ports or all transmission layers across all resource blocks and symbols for the PDSCH are the same as the two or more TCI states that apply to the DMRS ports and the transmission layer across all resource blocks and symbols of the DCI.

107. The non-transitory computer-readable medium of clause 105 or clause 106, wherein the DCI includes a TCI field that indicates the two or more TCI states that apply to all DMRS ports or all transmission layers across all resource blocks and symbols for the PDSCH.

108. The non-transitory computer-readable medium of any of clauses 99-107, further comprising code to transmit a RRC message configuring a PDCCH candidate with two or more TCI states that apply to a PDCCH DMRS port and a transmission layer across all resource blocks and symbols of the PDCCH candidate.

109. The non-transitory computer-readable medium of clause 108, wherein the RRC message is for: one or more PDCCH candidates, all PDCCH candidates in a search space set, or all PDCCH candidates in all search space sets associated with a CORESET.

110. The non-transitory computer-readable medium of any of clauses 99-109, further comprising code to transmit a MAC-CE that activates two or more TCI states that apply to a PDCCH DMRS port and a transmission layer across all resource blocks and symbols of a CORESET on which the DCI is received.

111. The non-transitory computer-readable medium of any of clauses 99-110, further comprising code to transmit two or more reference signals from the two or more TRPs, wherein each of the two or more reference signals is associated with one of the two or more TCI states.

112. The non-transitory computer-readable medium of any of clauses 99-111, further comprising code to receive a capability indicating a time duration for determining a quasi-co-location (QCL) when a configuration indicates that a DCI can indicate two or more TCI states that apply to all DMRS ports or all transmission layers across all resource blocks and symbols for a PDSCH, further comprising scheduling the PDSCH with a time duration between the DCI and the PDSCH that is at least the indicated time duration.

113. A method of wireless communication, comprising:
receiving a control message configuring at least one physical downlink control channel (PDCCH) candidate with two or more transmission configuration indication (TCI) states that apply to a PDCCH demodulation reference signal (DMRS) port or a transmission layer across all resource blocks and symbols of the PDCCH candidate;
determining a composite quasi-co-location (QCL) based on the two or more TCI states; and
receiving a downlink control information (DCI) on the at least one PDCCH candidate based on the composite QCL.

114. The method of clause 113, wherein the control message is a radio resource control (RRC) message and is for: one or more PDCCH candidates, all PDCCH candidates in a search space set, or all PDCCH candidates in all search space sets associated with a CORESET.

115. The method of clause 113, wherein the control message is a media access control-control element (MAC-CE) that activates the two or more TCI states that apply to the PDCCH DMRS port or the transmission layer across all resource blocks and symbols of a CORESET on which the DCI is received.

116. The method of any of clauses 113-115, wherein determining the composite QCL comprises deriving the composite QCL from two or more reference signals, wherein each of the two or more reference signals is associated with one of the two or more TCI states.

117. The method of any of clauses 113-116, wherein the DCI is received in a CORESET that is configured for scheduling PDSCHs with two or more TCI states that apply to all DMRS ports or all transmission layers across all resource blocks and symbols of a respective PDSCH, further comprising differentiating that the two or more TCI states apply to all DMRS ports or all transmission layers across all resource blocks and symbols for the PDSCH from TCI states that apply to different sets of DMRS ports or different sets of resource blocks or symbols based on the CORESET on which the DCI is received.

118. The method of clause 117, wherein the two or more TCI states that apply to all DMRS ports or all transmission layers across all resource blocks and symbols for the PDSCH are the same as the two or more TCI states that apply to the PDCCH DMRS port or all transmission layers across all resource blocks and symbols of the PDCCH candidate.

119. An apparatus for wireless communication, comprising:
a memory storing computer-executable instructions; and
at least one processor coupled to the memory and configured to execute the computer-executable instructions to:
receive a control message configuring at least one physical downlink control channel (PDCCH) candidate with two or more transmission configuration indication (TCI) states that apply to a PDCCH demodulation reference signal (DMRS) port or a transmission layer across all resource blocks and symbols of the PDCCH candidate;
determine a composite quasi-co-location (QCL) based on the two or more TCI states; and
receive a downlink control information (DCI) on the at least one PDCCH candidate based on the composite QCL.

120. The apparatus of clause 119, wherein the control message is a radio resource control (RRC) message and is for: one or more PDCCH candidates, all PDCCH candidates in a search space set, or all PDCCH candidates in all search space sets associated with a CORESET.

121. The apparatus of clause 119, wherein the control message is a media access control-control element (MAC-CE) that activates the two or more TCI states that apply to the PDCCH DMRS port or the transmission layer across all resource blocks and symbols of a CORESET on which the DCI is received.

122. The apparatus of any of clauses 119-121, wherein the at least one processor is configured to derive the composite QCL from two or more reference signals, wherein each of the two or more reference signals is associated with one of the two or more TCI states.

123. The apparatus of any of clauses 119-122, wherein the DCI is received in a CORESET that is configured for scheduling PDSCHs with two or more TCI states that apply to all DMRS ports or all transmission layers across all resource blocks and symbols of a respective PDSCH, wherein the at least one processor is configured to differentiate that the two or more TCI states apply to all DMRS ports or all transmission layers across all resource blocks and symbols for the PDSCH from TCI states that apply to different sets of DMRS ports or different sets of resource blocks or symbols based on the CORESET on which the DCI is received.

124. The apparatus of clause 123, wherein the two or more TCI states that apply to all DMRS ports or all transmission layers across all resource blocks and symbols for the PDSCH are the same as the two or more TCI states that apply to the PDCCH DMRS port or all transmission layers across all resource blocks and symbols of the PDCCH candidate.

125. An apparatus for wireless communication, comprising:
- means for receiving a control message configuring at least one physical downlink control channel (PDCCH) candidate with two or more transmission configuration indication (TCI) states that apply to a PDCCH demodulation reference signal (DMRS) port or a transmission layer across all resource blocks and symbols of the PDCCH candidate;
- means for determining a composite quasi-co-location (QCL) based on the two or more TCI states; and
- means for receiving a downlink control information (DCI) on the at least one PDCCH candidate based on the composite QCL.

126. The apparatus of clause 125, wherein the control message is a radio resource control (RRC) message and is for: one or more PDCCH candidates, all PDCCH candidates in a search space set, or all PDCCH candidates in all search space sets associated with a CORESET.

127. The apparatus of clause 125, wherein the control message is a media access control-control element (MAC-CE) that activates the two or more TCI states that apply to the PDCCH DMRS port or the transmission layer across all resource blocks and symbols of a CORESET on which the DCI is received.

128. The apparatus of any of clauses 125-127, wherein the means for determining the composite QCL is configured to derive the composite QCL from two or more reference signals, wherein each of the two or more reference signals is associated with one of the two or more TCI states.

129. The apparatus of any of clauses 125-128, wherein the DCI is received in a CORESET that is configured for scheduling PDSCHs with two or more TCI states that apply to all DMRS ports or all transmission layers across all resource blocks and symbols of a respective PDSCH, further comprising means for differentiating that the two or more TCI states apply to all DMRS ports or all transmission layers across all resource blocks and symbols for the PDSCH from TCI states that apply to different sets of DMRS ports or different sets of resource blocks or symbols based on the CORESET on which the DCI is received.

130. The apparatus of clause 129, wherein the two or more TCI states that apply to all DMRS ports or all transmission layers across all resource blocks and symbols for the PDSCH are the same as the two or more TCI states that apply to the PDCCH DMRS port or all transmission layers across all resource blocks and symbols of the PDCCH candidate.

131. A non-transitory computer-readable medium storing computer executable code, the code when executed by a processor causes the processor to:
- receive a control message configuring at least one physical downlink control channel (PDCCH) candidate with two or more transmission configuration indication (TCI) states that apply to a PDCCH demodulation reference signal (DMRS) port or a transmission layer across all resource blocks and symbols of the PDCCH candidate
- determine a composite quasi-co-location (QCL) based on the two or more TCI states; and
- receive a downlink control information (DCI) on the at least one PDCCH candidate based on the composite QCL.

132. The non-transitory computer-readable medium of clause 131, wherein the control message is a radio resource control (RRC) message and is for: one or more PDCCH candidates, all PDCCH candidates in a search space set, or all PDCCH candidates in all search space sets associated with a CORESET.

133. The non-transitory computer-readable medium of clause 131, wherein the control message is a media access control-control element (MAC-CE) that activates the two or more TCI states that apply to the PDCCH DMRS port or the transmission layer across all resource blocks and symbols of a CORESET on which the DCI is received.

134. The non-transitory computer-readable medium of any of clauses 131-133, wherein the code to determine the composite QCL comprises code to derive the composite QCL from two or more reference signals, wherein each of the two or more reference signals is associated with one of the two or more TCI states.

135. The non-transitory computer-readable medium of any of clauses 131-134, wherein the DCI is received in a CORESET that is configured for scheduling PDSCHs with two or more TCI states that apply to all DMRS ports or all transmission layers across all resource blocks and symbols of a respective PDSCH, wherein the non-transitory computer-readable medium comprises code to differentiate that the two or more TCI states apply to all DMRS ports or all transmission layers across all resource blocks and symbols for the PDSCH from TCI states that apply to different sets of DMRS ports or different sets of resource blocks or symbols based on the CORESET on which the DCI is received.

136. The non-transitory computer-readable medium of clause 135, wherein the two or more TCI states that apply to all DMRS ports or all transmission layers across all resource blocks and symbols for the PDSCH are the same as the two or more TCI states that apply to the PDCCH DMRS port or all transmission layers across all resource blocks and symbols of the PDCCH candidate.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication at a user equipment, comprising:
receiving a downlink control information (DCI) indicating two or more transmission configuration indication (TCI) states for a physical downlink shared channel (PDSCH);
differentiating the two or more TCI states from other TCI states, wherein the two or more TCI states apply to all demodulation reference signal (DMRS) ports of the PDSCH across all resource blocks and symbols for the PDSCH or all transmission layers of the PDSCH across all resource blocks and symbols for the PDSCH and further wherein the other TCI states apply to different sets of DMRS ports or different sets of resource blocks or symbols; and
receiving the PDSCH, wherein the reception is based on a composite quasi-co-location (QCL) and wherein the reception is in response to the differentiating the two or more TCI states from the other TCI states, and further wherein the composite QCL is based on the two or more TCI states.

2. The method of claim 1, further comprising receiving a radio resource control (RRC) message indicating that the two or more TCI states in the DCI apply to all DMRS ports of the PDSCH across all resource blocks and symbols for the PDSCH or all transmission layers of the PDSCH across all resource blocks and symbols for the PDSCH prior to receiving the DCI, wherein the differentiating is based on the RRC message.

3. The method of claim 1, further comprising receiving a media access control (MAC) control element (CE) that labels a TCI codepoint of the DCI, wherein the labeled TCI codepoint indicates the two or more TCI states that apply to all DMRS ports of the PDSCH across all resource blocks and symbols for the PDSCH or all transmission layers of the PDSCH across all resource blocks and symbols for the PDSCH, wherein the differentiating is based on the label of the TCI codepoint of the DCI.

4. The method of claim 1, wherein the differentiating is based on a bit of the DCI that explicitly indicates whether the two or more TCI states apply to all DMRS ports of the PDSCH across all resource blocks and symbols for the PDSCH or all transmission layers of the PDSCH across all resource blocks and symbols for the PDSCH.

5. The method of claim 1, wherein the DCI indicates at least three TCI states, wherein the differentiating is based on the three TCI states that apply to all DMRS ports of the PDSCH across all resource blocks and symbols for the PDSCH or all transmission layers of the PDSCH across all resource blocks and symbols for the PDSCH.

6. The method of claim 1, wherein the DCI is received in a CORESET that is configured for scheduling PDSCHs with two or more TCI states that apply to all DMRS ports of a respective PDSCH across all resource blocks and symbols for the respective PDSCH or all transmission layers of the respective PDSCH across all resource blocks and symbols of the respective PDSCH, wherein the differentiating is based on the CORESET on which the DCI is received.

7. The method of claim 6, wherein the DCI is received in the CORESET with two or more TCI states that apply to a physical downlink control channel (PDCCH) DMRS port or a transmission layer across all resource blocks and symbols of the DCI.

8. The method of claim 7, wherein the two or more TCI states that apply to all DMRS ports of the PDSCH across all resource blocks and symbols for the PDSCH or all transmission layers of the PDSCH across all resource blocks and symbols for the PDSCH are the same as the two or more TCI states that apply to the PDCCH DMRS port or all transmission layers across all resource blocks and symbols of the DCI received in the CORESET.

9. The method of claim 7, wherein the DCI received in the CORESET includes a TCI field that indicates the two or more TCI states that apply to all DMRS ports of the PDSCH across all resource blocks and symbols for the PDSCH or all transmission layers of the PDSCH across all resource blocks and symbols for the PDSCH.

10. The method of claim 1, further comprising receiving a RRC message configuring a PDCCH candidate with two or more TCI states that apply to a PDCCH DMRS port or a transmission layer across all resource blocks and symbols of the PDCCH candidate.

11. The method of claim 1, further comprising receiving a MAC-CE that activates two or more TCI states that apply to a PDCCH DMRS port or a transmission layer across all resource blocks and symbols of a CORESET on which the DCI is received.

12. The method of claim 1, further comprising deriving the composite QCL from two or more reference signals, wherein each of the two or more reference signals is associated with a different one of the two or more TCI states.

13. The method of claim 1, further comprising transmitting a capability indicating a time duration for determining the composite QCL when a configuration indicates that a DCI can indicate two or more TCI states that apply to all DMRS ports of a PDSCH across all resource blocks and symbols for the PDSCH or all transmission layers of the PDSCH across all resource blocks and symbols for the PDSCH, wherein a time duration between the DCI and the PDSCH is at least the indicated time duration.

14. A method of wireless communication at a base station, comprising:
transmitting a downlink control information (DCI) indicating two or more transmission configuration indication (TCI) states for a physical downlink shared channel (PDSCH), wherein the DCI differentiates the two or more TCI states from other TCI states, wherein the two or more TCI states apply to all demodulation reference signal (DMRS) ports of the PDSCH across all resource blocks and symbols for the PDSCH or all transmission layers of the PDSCH across all resource blocks and symbols for the PDSCH, and further wherein the other TCI states apply to different sets of DMRS ports or different sets of resource blocks or symbols; and
transmitting the PDSCH from two or more transmit receive points (TRPs), wherein each of the TRPs corresponds to one of the TCI states.

15. The method of claim 14, further comprising transmitting a radio resource control (RRC) message indicating that the or more two TCI states in the DCI apply to all DMRS ports of the PDSCH across all resource blocks and symbols for the PDSCH or all transmission layers of the PDSCH across all resource blocks and symbols for the PDSCH prior to transmitting the DCI.

16. The method of claim 14, further comprising transmitting a media access control (MAC) control element (CE) that labels a TCI codepoint of the DCI, wherein the labeled TCI codepoint indicates the two or more TCI states that apply to all DMRS ports of the PDSCH across all resource blocks and symbols for the PDSCH or all transmission layers of the PDSCH across all resource blocks and symbols for the PDSCH.

17. The method of claim 14, wherein a bit of the DCI explicitly indicates whether the two or more TCI states apply to all DMRS ports of the PDSCH across all resource blocks and symbols for the PDSCH or all transmission layers of the PDSCH across all resource blocks and symbols for the PDSCH.

18. The method of claim 14, wherein the DCI indicates at least three TCI states that apply to all DMRS ports of the PDSCH across all resource blocks and symbols for the PDSCH or all transmission layers of the PDSCH across all resource blocks and symbols for the PDSCH.

19. The method of claim 14, wherein the DCI is transmitted in a CORESET that is configured for scheduling PDSCHs with two or more TCI states that apply to all DMRS ports of a respective PDSCH across all resource blocks and symbols for the respective PDSCH or all transmission layers of the respective PDSCH across all resource blocks and symbols of the respective PDSCH.

20. The method of claim 19, wherein the DCI is transmitted in the CORESET with two or more TCI states that apply to a physical downlink control channel (PDCCH) DMRS port and a transmission layer across all resource blocks and symbols of the DCI.

21. The method of claim 20, wherein the two or more TCI states that apply to all DMRS ports of the PDSCH across all resource blocks and symbols for the PDSCH or all transmission layers of the PDSCH across all resource blocks and symbols for the PDSCH are the same as the two or more TCI states that apply to the DMRS ports and the transmission layer across all resource blocks and symbols of the DCI in the CORESET.

22. The method of claim 14, further comprising transmitting a RRC message configuring a PDCCH candidate with two or more TCI states that apply to a PDCCH DMRS port and a transmission layer across all resource blocks and symbols of the PDCCH candidate.

23. The method of claim 22, wherein the RRC message is for: one or more PDCCH candidates, all PDCCH candidates in a search space set, or all PDCCH candidates in all search space sets associated with a CORESET.

24. The method of claim 14, further comprising transmitting a MAC-CE that activates two or more TCI states that apply to a PDCCH DMRS port and a transmission layer across all resource blocks and symbols of a CORESET on which the DCI is received.

25. The method of claim 14, further comprising transmitting two or more reference signals from the two or more TRPs, wherein each of the two or more reference signals is associated with one of the two or more TCI states.

26. The method of claim 14, further comprising receiving a capability indicating a time duration for determining a quasi-co-location (QCL) when a configuration indicates that a DCI can indicate two or more TCI states that apply to all DMRS ports of the PDSCH across all resource blocks and symbols for the PDSCH or all transmission layers of the PDSCH across all resource blocks and symbols for the PDSCH, further comprising scheduling the PDSCH with a time duration between the DCI and the PDSCH that is at least the indicated time duration.

27. An apparatus for wireless communication, comprising:
a memory storing computer-executable instructions; and
at least one processor configured to execute the computer-executable instructions and cause the apparatus to:
receive a downlink control information (DCI) indicating two or more transmission configuration indication (TCI) states for a physical downlink shared channel (PDSCH);
differentiate the two or more TCI states from other TCI states, wherein the two or more TCI states apply to all demodulation reference signal (DMRS) ports of the PDSCH across all resource blocks and symbols for the PDSCH or all transmission layers of the PDSCH across all resource blocks and symbols for the PDSCH and further wherein the other TCI states apply to different sets of DMRS ports or different sets of resource blocks or symbols; and
receive the PDSCH, wherein the reception is based on a composite quasi-co-location (QCL) and wherein the reception is in response to the differentiating, and further wherein the composite QCL is based on the two or more TCI states.

28. The apparatus of claim 27, wherein the at least one processor is further configured to cause the apparatus to receive a radio resource control (RRC) message indicating that the two or more TCI states in the DCI apply to all DMRS ports of the PDSCH across all resource blocks and symbols for the PDSCH or all transmission layers of the PDSCH across all resource blocks and symbols for the PDSCH prior to receiving the DCI, wherein the at least one processor is further configured to cause the apparatus to differentiate based on the RRC message.

29. The apparatus of claim 27, wherein the at least one processor is further configured to cause the apparatus to receive a media access control (MAC) control element (CE) that labels a TCI codepoint of the DCI, wherein the labeled TCI codepoint indicates the two or more TCI states that apply to all DMRS ports of the PDSCH across all resource blocks and symbols for the PDSCH or all transmission layers of the PDSCH across all resource blocks and symbols for the PDSCH, wherein the at least one processor is further configured to cause the apparatus to differentiate based on the label of the TCI codepoint of the DCI.

30. The apparatus of claim 27, wherein the at least one processor is further configured to cause the apparatus to differentiate based on a bit of the DCI that explicitly indicates whether the two or more TCI states apply to all DMRS ports of the PDSCH across all resource blocks and symbols for the PDSCH or all transmission layers of the PDSCH across all resource blocks and symbols for the PDSCH.

31. The apparatus of claim 27, wherein the DCI indicates at least three TCI states, wherein the differentiating is based on the three TCI states that apply to all DMRS ports of the PDSCH across all resource blocks and symbols for the PDSCH or all transmission layers of the PDSCH across all resource blocks and symbols for the PDSCH.

32. The apparatus of claim 27, wherein the DCI is received in a CORESET that is configured for scheduling PDSCHs with two or more TCI states that apply to all DMRS ports of a respective PDSCH across all resource blocks and symbols for the respective PDSCH or all transmission layers of the respective PDSCH across all resource blocks and symbols of the respective PDSCH, wherein the at least one processor is further configured to cause the apparatus to differentiate based on the CORESET on which the DCI is received.

33. The apparatus of claim 32, wherein the DCI is received in the CORESET with two or more TCI states that apply to a physical downlink control channel (PDCCH) DMRS port or a transmission layer across all resource blocks and symbols of the DCI.

34. The apparatus of claim 33, wherein the two or more TCI states that apply to all DMRS ports of the PDSCH across all resource blocks and symbols for the PDSCH or all transmission layers of the PDSCH across all resource blocks and symbols for the PDSCH are the same as the two or more TCI states that apply to the PDCCH DMRS port or the transmission layer across all resource blocks and symbols of the DCI received in the CORESET.

35. The apparatus of claim 33, wherein the DCI received in the CORESET includes a TCI field that indicates the two or more TCI states that apply to all DMRS ports of the PDSCH across all resource blocks and symbols for the PDSCH or all transmission layers of the PDSCH across all resource blocks and symbols for the PDSCH.

36. The apparatus of claim 27, wherein the at least one processor is further configured to cause the apparatus to receive a RRC message that configures a PDCCH candidate with two or more TCI states that apply to a PDCCH DMRS port or a transmission layer across all resource blocks and symbols of the PDCCH candidate.

37. The apparatus of claim 36, wherein the RRC message is for: one or more PDCCH candidates, all PDCCH candidates in a search space set, or all PDCCH candidates in all search space sets associated with a CORESET.

38. The apparatus of claim 27, wherein the at least one processor is further configured to cause the apparatus to receive a MAC-CE that activates two or more TCI states that apply to a PDCCH DMRS port or a transmission layer across all resource blocks and symbols of a CORESET on which the DCI is received.

39. The apparatus of claim 27, wherein the at least one processor is further configured to cause the apparatus to derive the composite QCL from two or more reference signals, wherein each of the two or more reference signals is associated with a different one of the two or more TCI states.

40. The apparatus of claim 27, wherein the at least one processor is further configured to cause the apparatus to output for transmission a capability indicating a time duration for determining the composite QCL when a configuration indicates that a DCI can indicate two or more TCI states that apply to all DMRS ports of the PDSCH across all resource blocks and symbols for the PDSCH or all transmission layers of the PDSCH across all resource blocks and symbols for the PDSCH, wherein a time duration between the DCI and the PDSCH is at least the indicated time duration.

41. The apparatus of claim 27, wherein the apparatus is configured as a user equipment.

42. An apparatus for wireless communication, comprising:
a memory storing computer-executable instructions; and
at least one processor configured to execute the computer-executable instructions and cause the apparatus to:

output for transmission a downlink control information (DCI) indicating two or more transmission configuration indication (TCI) states for a physical downlink shared channel (PDSCH), wherein the DCI differentiates that the two or more TCI states apply to all demodulation reference signal (DMRS) ports of the PDSCH across all resource blocks and symbols for the PDSCH or all transmission layers of the PDSCH across all resource blocks and symbols for the PDSCH from TCI states that apply to different sets of DMRS ports or different sets of resource blocks or symbols; and output for transmission the PDSCH via two or more transmit receive points (TRPs), wherein each of the TRPs corresponds to one of the TCI states.

43. The apparatus of claim 42, wherein the at least one processor is further configured to cause the apparatus to output for transmission a radio resource control (RRC) message indicating that the two or more TCI states in the DCI apply to all DMRS ports of the PDSCH across all resource blocks and symbols for the PDSCH or all transmission layers of the PDSCH across all resource blocks and symbols for the PDSCH prior to transmitting the DCI.

44. The apparatus of claim 42, wherein the at least one processor is further configured to cause the apparatus to output for transmission a media access control (MAC) control element (CE) that labels a TCI codepoint of the DCI, wherein the labeled TCI codepoint indicates the two or more TCI states that apply to all DMRS ports of the PDSCH across all resource blocks and symbols for the PDSCH or all transmission layers of the PDSCH across all resource blocks and symbols for the PDSCH.

45. The apparatus of claim 42, wherein a bit of the DCI explicitly indicates whether the two or more TCI states apply to all DMRS ports of the PDSCH across all resource blocks and symbols for the PDSCH or all transmission layers of the PDSCH across all resource blocks and symbols for the PDSCH.

46. The apparatus of claim 42, wherein the DCI indicates at least three TCI states that apply to all DMRS ports of the PDSCH across all resource blocks and symbols for the PDSCH or all transmission layers of the PDSCH across all resource blocks and symbols for the PDSCH.

47. The apparatus of claim 42, wherein the DCI is output for transmission in a CORESET that is configured for scheduling PDSCHs with two or more TCI states that apply to all DMRS ports of a respective PDSCH across all resource blocks and symbols for the respective PDSCH or all transmission layers of the respective PDSCH across all resource blocks and symbols of the respective PDSCH.

48. The apparatus of claim 47, wherein the DCI is output for transmission in the CORESET with two or more TCI states that apply to a physical downlink control channel (PDCCH) DMRS port and a transmission layer across all resource blocks and symbols of the DCI.

49. The apparatus of claim 48, wherein the two or more TCI states that apply to all DMRS ports of the PDSCH across all resource blocks and symbols for the PDSCH or all transmission layers of the PDSCH across all resource blocks and symbols for the PDSCH are the same as the two or more TCI states that apply to the DMRS ports and the transmission layer across all resource blocks and symbols of the DCI in the CORESET.

50. The apparatus of claim 48, wherein the DCI in the CORESET includes a TCI field that indicates the two or more TCI states that apply to all DMRS ports of the PDSCH across all resource blocks and symbols for the PDSCH or all transmission layers of the PDSCH across all resource blocks and symbols for the PDSCH.

51. The apparatus of claim 42, wherein the at least one processor is further configured to cause the apparatus to output for transmission a RRC message configuring a PDCCH candidate with two or more TCI states that apply to a PDCCH DMRS port and a transmission layer across all resource blocks and symbols of the PDCCH candidate.

52. The apparatus of claim 51, wherein the RRC message is for: one or more PDCCH candidates, all PDCCH candidates in a search space set, or all PDCCH candidates in all search space sets associated with a CORESET.

53. The apparatus of claim 42, wherein the at least one processor is further configured to cause the apparatus to output for transmission a MAC-CE that activates two or more TCI states that apply to a PDCCH DMRS port and a transmission layer across all resource blocks and symbols of a CORESET on which the DCI is received.

54. The apparatus of claim 42, wherein the at least one processor is further configured to cause the apparatus to output for transmission two or more reference signals from the two or more TRPs, wherein each of the two or more reference signals is associated with one of the two or more TCI states.

55. The apparatus of claim 42, wherein the at least one processor is further configured to cause the apparatus to receive a capability indicating a time duration for determining a quasi-co-location (QCL) when a configuration indicates that a DCI can indicate two or more TCI states that apply to all DMRS ports of the PDSCH across all resource blocks and symbols for the PDSCH or all transmission layers of the PDSCH across all resource blocks and symbols for the PDSCH, further comprising scheduling the PDSCH with a time duration between the DCI and the PDSCH that is at least the indicated time duration.

56. The apparatus of claim 42, wherein the apparatus is configured as a base station.

57. A method of wireless communication at a user equipment, comprising:
receiving a control message configuring at least one physical downlink control channel (PDCCH) candidate with two or more transmission configuration indication (TCI) states that apply to a PDCCH demodulation reference signal (DMRS) port or a transmission layer across all resource blocks and symbols of the PDCCH candidate;
and
receiving a downlink control information (DCI) on the at least one PDCCH candidate based on a composite quasi-co-location (QCL), wherein the composite QCL is based on the two or more TCI states.

58. The method of claim 57, wherein the control message is a radio resource control (RRC) message and is for: one or more PDCCH candidates, all PDCCH candidates in a search space set, or all PDCCH candidates in all search space sets associated with a CORESET.

59. The method of claim 57, wherein the control message is a media access control-control element (MAC-CE) that activates the two or more TCI states that apply to the PDCCH DMRS port or the transmission layer across all resource blocks and symbols of a CORESET on which the DCI is received.

60. The method of claim 57, further comprising deriving the composite QCL from two or more reference signals, wherein each of the two or more reference signals is associated with a different one of the two or more TCI states.

61. The method of claim 57, wherein the DCI is received in a CORESET that is configured for scheduling PDSCHs with two or more TCI states that apply to all DMRS ports of a respective PDSCH across all resource blocks and symbols for the respective PDSCH or all transmission layers of the respective PDSCH across all resource blocks and symbols of the respective PDSCH, further comprising differentiating the two or more TCI states from other TCI states based on the CORESET on which the DCI is received, wherein the two or more TCI states apply to all DMRS ports of a PDSCH across all resource blocks and symbols for the PDSCH or all transmission layers of the PDSCH across all resource blocks and symbols for the PDSCH and further wherein the other TCI states apply to different sets of DMRS ports or different sets of resource blocks or symbols.

62. An apparatus for wireless communication, comprising:
a memory storing computer-executable instructions; and
at least one processor configured to execute the computer-executable instructions and cause the apparatus to:
receive a control message configuring at least one physical downlink control channel (PDCCH) candidate with two or more transmission configuration indication (TCI) states that apply to a PDCCH demodulation reference signal (DMRS) port or a transmission layer across all resource blocks and symbols of the PDCCH candidate;
and
receive a downlink control information (DCI) on the at least one PDCCH candidate based on a composite quasi-co-location (QCL), wherein the QCL is based on the two or more TCI states.

63. The apparatus of claim 62, wherein the control message is a radio resource control (RRC) message and is for: one or more PDCCH candidates, all PDCCH candidates in a search space set, or all PDCCH candidates in all search space sets associated with a CORESET.

64. The apparatus of claim 62, wherein the control message is a media access control-control element (MAC-CE) that activates the two or more TCI states that apply to the PDCCH DMRS port or the transmission layer across all resource blocks and symbols of a CORESET on which the DCI is received.

65. The apparatus of claim 62, wherein the at least one processor is further configured to cause the apparatus to derive the composite QCL from two or more reference signals, wherein each of the two or more reference signals is associated with a different one of the two or more TCI states.

66. The apparatus of claim 62, wherein the DCI is received in a CORESET that is configured for scheduling PDSCHs with two or more TCI states that apply to all DMRS ports of a respective PDSCH across all resource blocks and symbols for the respective PDSCH or all transmission layers of the respective PDSCH across all resource blocks and symbols of the respective PDSCH, wherein the at least one processor is configured to differentiate the two or more TCI states from other TCI states based on the CORESET on which the DCI is received, and further wherein the two or more TCI states apply to all DMRS ports of a PDSCH across all resource blocks and symbols for the PDSCH or all transmission layers of the PDSCH across all resource blocks and symbols for the PDSCH, wherein the other TCI states apply to different sets of DMRS ports or different sets of resource blocks or symbols.

67. The apparatus of claim 66, wherein the two or more TCI states that apply to all DMRS ports of the PDSCH across all resource blocks and symbols for the PDSCH or all transmission layers of the PDSCH across all resource blocks and symbols for the PDSCH are the same as the two or more TCI states that apply to the PDCCH DMRS port or the transmission layer across all resource blocks and symbols of the PDCCH candidate.

68. The apparatus of claim 62, wherein the apparatus is configured as a user equipment.

* * * * *